US012810127B2

United States Patent
Imber

(10) Patent No.: US 12,810,127 B2
(45) Date of Patent: Nov. 24, 2026

(54) METHODS AND SYSTEMS FOR SELECTING NUMBER FORMATS FOR DEEP NEURAL NETWORKS BASED ON NETWORK SENSITIVITY AND QUANTISATION ERROR

(71) Applicant: Imagination Technologies Limited, Kings Langley (GB)

(72) Inventor: James Imber, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 1350 days.

(21) Appl. No.: 17/327,154

(22) Filed: May 21, 2021

(65) Prior Publication Data

US 2022/0012574 A1 Jan. 13, 2022

(30) Foreign Application Priority Data

Jun. 19, 2020 (GB) ..................................... 2009432

(51) Int. Cl.
*G06N 3/063* (2023.01)

(52) U.S. Cl.
CPC .................................... *G06N 3/063* (2013.01)

(58) Field of Classification Search
CPC ............................... G06N 20/00; G06N 3/084
See application file for complete search history.

(56) References Cited

U.S. PATENT DOCUMENTS 10,229,356 B1 3/2019 Liu et al.
10,621,486 B2 4/2020 Yao
(Continued)

FOREIGN PATENT DOCUMENTS

CN 106485321 A 3/2017
CN 107403221 A 11/2017
(Continued)

OTHER PUBLICATIONS

Ko et al; "Design and Analysis of a Neural Network Inference Engine Based on Adaptive Weight Compression"; IEEE Transactions on Computer-Aided Design of Integrated Circuits and Systems; vol. 38, No. 1; Jan. 2019; pp. 109-121.
(Continued)

*Primary Examiner* — Omar F Fernandez Rivas
*Assistant Examiner* — Corey M Sackalosky
(74) *Attorney, Agent, or Firm* — Potomac Law Group, PLLC; Vincent M DeLuca

(57) ABSTRACT

A method of determining a number format for representing a set of two or more network parameters of a Deep Neural Network "DNN" for use in configuring hardware logic to implement the DNN. The method includes: determining a sensitivity of the DNN with respect to each network parameter in the set of network parameters; for each candidate number format of a plurality of candidate number formats: determining a quantisation error associated with quantising each network parameter in the set of network parameters in accordance with the candidate number format; generating an estimate of an error in an output of the DNN caused by quantisation of the set of network parameters based on the sensitivities and the quantisation errors; generating a local error based on the estimated error; and selecting the candidate number format of the plurality of candidate number formats with the minimum local error as the number format for the set of network parameters.

20 Claims, 17 Drawing Sheets

(56) References Cited

U.S. PATENT DOCUMENTS

| | | | | |
|---|---|---|---|---|
| 10,802,992 | B2 | 10/2020 | Yu et al. | |
| 10,885,427 | B2 | 1/2021 | Imber | |
| 11,392,823 | B2 | 7/2022 | Imber | |
| 11,593,626 | B2 | 2/2023 | Imber et al. | |
| 11,769,035 | B1 | 9/2023 | Wei et al. | |
| 2007/0094168 | A1 | 4/2007 | Ayala et al. | |
| 2012/0217945 | A1* | 8/2012 | Kiadeh | H02M 3/156 323/285 |
| 2014/0046885 | A1* | 2/2014 | Majumdar | G06N 3/049 706/22 |
| 2016/0328645 | A1 | 11/2016 | Lin et al. | |
| 2016/0328646 | A1 | 11/2016 | Lin et al. | |
| 2016/0328647 | A1 | 11/2016 | Lin et al. | |
| 2017/0024642 | A1 | 1/2017 | Xiong et al. | |
| 2017/0061279 | A1 | 3/2017 | Yang et al. | |
| 2017/0140259 | A1 | 5/2017 | Bergstra et al. | |
| 2017/0220929 | A1 | 8/2017 | Rozen et al. | |
| 2017/0367685 | A1 | 12/2017 | Zou et al. | |
| 2018/0017925 | A1 | 1/2018 | Yoshimura et al. | |
| 2018/0046896 | A1 | 2/2018 | Yu et al. | |
| 2018/0060278 | A1 | 3/2018 | Lin et al. | |
| 2018/0107451 | A1 | 4/2018 | Harrer et al. | |
| 2018/0181881 | A1 | 6/2018 | Du et al. | |
| 2018/0189642 | A1 | 7/2018 | Boesch et al. | |
| 2018/0211152 | A1 | 7/2018 | Migacz et al. | |
| 2019/0034784 | A1 | 1/2019 | Li et al. | |
| 2019/0095777 | A1 | 3/2019 | Kim et al. | |
| 2019/0122100 | A1 | 4/2019 | Kang et al. | |
| 2019/0180177 | A1* | 6/2019 | Yim | G06F 7/483 |
| 2019/0227893 | A1* | 7/2019 | Imber | G06F 7/4836 |
| 2019/0228293 | A1* | 7/2019 | Imber | G06F 7/5443 |
| 2019/0236436 | A1 | 8/2019 | Imber et al. | |
| 2019/0236449 | A1 | 8/2019 | Imber | |
| 2019/0340499 | A1* | 11/2019 | Burger | G06N 3/084 |
| 2019/0371167 | A1* | 12/2019 | Min | G08G 1/08 |
| 2020/0202218 | A1* | 6/2020 | Csefalvay | G06N 3/04 |
| 2020/0210840 | A1 | 7/2020 | Rouhani et al. | |
| 2020/0349922 | A1 | 11/2020 | Peyser et al. | |
| 2021/0183373 | A1 | 6/2021 | Moritz et al. | |
| 2021/0319784 | A1 | 10/2021 | Le Roux et al. | |
| 2022/0044096 | A1 | 2/2022 | Asad et al. | |

FOREIGN PATENT DOCUMENTS

| | | | |
|---|---|---|---|
| CN | 108133285 | A | 6/2018 |
| CN | 108229663 | A | 6/2018 |
| CN | 109165727 | A | 1/2019 |
| CN | 110033079 | A | 7/2019 |
| CN | 110050256 | A | 7/2019 |
| CN | 110059810 | A | 7/2019 |
| CN | 110457369 | A | 11/2019 |
| CN | 110991604 | A | 4/2020 |
| EP | 3242254 | A1 | 11/2017 |
| EP | 3480689 | A1 | 5/2019 |
| EP | 3671570 | A1 | 6/2020 |
| GB | 2566702 | A | 3/2019 |
| GB | 2568081 | A | 5/2019 |
| GB | 2568082 | A | 5/2019 |
| GB | 2568083 | A | 5/2019 |
| GB | 2568084 | A | 5/2019 |
| GB | 2552243 | B | 7/2020 |
| GB | 2580171 | A | 7/2020 |
| KR | 101644039 | B1 | 7/2016 |
| WO | 9838800 | A1 | 9/1998 |
| WO | 2018103538 | A1 | 6/2018 |
| WO | 2020190526 | A1 | 9/2020 |
| WO | 2021022903 | A1 | 2/2021 |

OTHER PUBLICATIONS

Courbariaux , M et al; "Training Deep Neural Networks with Low Precision Multiplications"; (Year:2015); p. 10.

Gupta, S. et al., "Deep Learning with Limited Numerical Precision" (Year:2015); 10 pages.

Sakr et al., "Analytical Guarantees on Numerical Precision of Deep Neural Networks," Proceedings of the 34th International Conference on Machine Learning, PMLR 70:3007-3016, 2017.

Lin et al., "Fixed Point Quantization of Deep Convolutional Networks," Proceeding ICML'16 Proceedings of the 33rd Internatonal Conference on International Conference on Machine Learning, vol. 48, pp. 2849-2858, New York, NY, USA—Jun. 19-24, 2016.

Chang, et al.: "Recurrent Neural Networks Hardware Implementation on FPGA", 2016, arXiv: 1511.05552v4 (Year: 2016).

Bergen et al.: "Going in circles is the way forward: the role of recurrence in visual inference", Mar. 2020, arxiv.org/abs/ 2003.12128v1 (Year: 2020).

Cambier et al.: "Shifted and Squeezed 8-Bit Floating Point Format for Low-Precision Training of Deep Neural Networks", Jan. 2020, arXiv:2001.05674v1 (Year: 2020).

Anonymous, "Fixed-point Arithmetic," Wikipedia, URL:https:1/en.wikipedia.org/w/index.php?title=Fixed-point_arithmetic&oldid=782344217; pp. 1-6.

Anwar et al., "Fixed Point Optimization of Deep Convolutional Neural Networks for Object Recognition," IEEE CASSP 2015, 978-1-4673-6997-8, pp. 1131-1135, Aug. 2015.

Balduzzi et al., "Neural Taylor Approximations: Convergence and Exploration in Rectifier Networks," Int'l Conference on Machine Learning, ICLR 2017.

Caffarena et al., "SQNR Estimation of Fixed-Point DSP Algorithms," 2010 EU RAS IP; pp. 1-12.

Graves et al; "Connectionist temporal classification labelling unsegmented sequence data with recurrent neural Networks," ICML '06: Proceedings of the 23rd International Conference on Machine Learning, Jun. 2006 pp. 369-376.

Gysel et al., "Hardware-Oriented Approximation of Convolutional Neural Networks," Cornell University Library, ICLR Apr. 2016, pp. 1-8.

Holt, Jordan L. et al., Finite Precision Error Analysis of Neural Network Hardware Implementations, 1993, IEEE (Year: 1993).

Johnson et al; "Effective Use of Word Order for Text Categorization with Convolutional Neural Networks"; Retrieved from the Internet: URL:https://arxiv.org/pdf/1412.1058; Mar. 26, 2015; 10 pages.

Judd et al; "Proteus: Exploiting precision variability in deep neural networks"; Parallel Computing; vol. 73; May 24, 2017; pp. 40-51.

Li, G et al., "On comparing three artificial neural networks for wind speed forecasting" (Year: 2010).

Loroch et al; "TensorQuant—A Simulation Toolbox for Deep Neural Network Quantization"; Retrieved from the intemet: URL:https:l-larxiv.org/pdf/1710.05758_pdf[retrieved on Feb. 26, 2019] pp. 1-10.

Moons et al., "Energy-Efficient ConvNets Through Approximate Computing," Cornell University Library, arXiv.org > • > arXiv: 1603.06777, Mar. 22, 2016.

Na et al., "Speeding up Convolutional Neural Network Training with Dynamic Precision Scaling and Flexible Multiplier-8 Accumulator," ISLPED '16: Proceedings of the 2016 International Symposium on Low Power Electronics and Design, Aug. 2016, pp. 58-63.

Naren; "AN4 Audio Database—Data Preparation and Running," Data Preparation and Running, 2020, URL: hllps://web.archive.org/web/20200907050552/hllps://github.com/SeanNaren/ deepspeech.torch/wiki/Data-Preparation-I\nd-Running.

Qui et al; "Going Deeper with Embedded FPGA Platform for Convolutional Neural Network"; Proceedings of the 2016 ACM/SIGDA International Symposium on Field-Programmable Gate Arrays; Jan. 1, 2016; pp. 26-35.

Silfa et al; "Boosting LSTM Performance Through Dynamic Precision Selection," Cornell University Library, 2019, Sections 2.1, 2.2,3.

Zahangir et al; "Effective Quantization Approaches for Recurrent Neural Networks", International Joint Conference on Neural Networks, 2018, pp. 1-8.

Ming et al; "Recurrent Neural Networks Hardware Implementation on FPGA"; International Journal of Advanced Research in Electrical, Electronics and Instrumentation Engineering; vol. 5; Jan. 2016; pp. 401-409.

(56) References Cited

OTHER PUBLICATIONS

Jacob et al.: "Quantization and Training of Neural Networks for Efficient Integer-Arithmetic-Only Inference", 2017, arXiv: 1712. 05877 (Year: 2017).

TensorFlow Model Optimization Team's article "TensorFlow Model Optimization Toolkit—Post-Training Integer Quantization," Jun. 2019, https://blog. tensorflow.org/2019/06/tensorflow-integer-quantization. html (Year: 2019).

* cited by examiner

METHODS AND SYSTEMS FOR SELECTING NUMBER FORMATS FOR DEEP NEURAL NETWORKS BASED ON NETWORK SENSITIVITY AND QUANTISATION ERROR

BACKGROUND

A Deep Neural Network (DNN) is a form of artificial neural network comprising a plurality of interconnected layers that can be used for machine learning applications. In particular, a DNN can be used in signal processing applications, including, but not limited to, image processing and computer vision applications. FIG. 1 illustrates an example DNN 100 that comprises a plurality of layers 102-1, 102-2, 102-3. Each layer 102-1, 102-2, 102-3 receives input data, and processes the input data in accordance with the layer to produce output data. The output data is either provided to another layer as the input data or is output as the final output data of the DNN. For example, in the DNN 100 FIG. 1 the first layer 102-1 receives the original input data 104 to the DNN 100 and processes the input data in accordance with the first layer 102-1 to produce output data. The output data of the first layer 102-1 becomes the input data to the second layer 102-2 which processes the input data in accordance with the second layer 102-2 to produce output data. The output data of the second layer 102-2 becomes the input data to the third layer 102-3 which processes the input data in accordance with the third layer 102-3 to produce output data. The output data of the third layer 102-3 is output as the output data 106 of the DNN.

Reference is made to FIG. 2 which illustrates an example overview of the format of data utilised in a DNN. As can be seen in FIG. 2, the data used in a DNN may be formed of a plurality of planes. For example, the input data may be arranged as P planes of data, where each plane has a dimension x×y.

The processing that is performed on the input data to a layer depends on the type of layer. For example, each layer of a DNN may be one of a plurality of different types. Example DNN layer types include, but are not limited to, a convolution layer, an activation layer, a normalisation layer, a pooling layer, and a fully connected layer. It will be evident to a person of skill in the art that these are example DNN layer types and that this is not an exhaustive list and there may be other DNN layer types.

For a convolution layer, the input data is processed by convolving the input data with weights associated with that layer. Specifically, each convolution layer is associated with a plurality of weights $w_0 \ldots w_g$, which may also be referred to as filter weights or coefficients. The weights are grouped to form, or define, one or more filters, which may also be referred to as kernels, and each filter may be associated with an offset bias bias. As shown in FIG. 2 each filter may have a dimension m×n×P (i.e. each filter may comprise a set of m×n×P weights w) and may be applied to the input data according to a convolution operation across steps s and t in the x and y directions. The number of filters and the number of weights per filter may vary between convolution layers. A convolutional neural network (CNN), which is a specific type of DNN that is effective for image recognition and classification, generally comprises a plurality of convolution layers.

An activation layer, which typically, but not necessarily follows a convolution layer, performs one or more activation functions on the input data to the layer. An activation function takes a single number and performs a certain non-linear mathematical operation on it. In some examples, an activation layer may act as rectified linear unit (ReLU) by implementing an ReLU function (i.e. $f(x)=\max(0, x)$) or a Parametric Rectified Linear Unit (PReLU) by implementing a PReLU function.

A normalisation layer is configured to perform a normalizing function, such as a Local Response Normalisation (LRN) function on the input data. A pooling layer, which is typically, but not necessarily inserted between successive convolution layers, performs a pooling function, such as a max or mean function, to summarise subsets of the input data. The purpose of a pooling layer is thus to reduce the spatial size of the representation to reduce the number of parameters and computation in the network, and hence to also control overfitting.

A fully connected layer, which typically, but not necessarily follows a plurality of convolution and pooling layers takes a three-dimensional set of input data values and outputs an N dimensional vector. Where the DNN is used for classification N may be the number of classes and each value in the vector may represent the probability of a certain class. The N dimensional vector is generated through a matrix multiplication of a set of weights, optionally followed by a bias offset. A fully connected layer thus receives a set of weights and a bias.

Accordingly, as shown in FIG. 3, each layer 302 of a DNN receives input data values and generates output data values; and some layers (such as convolution layers and fully-connected layers) also receive weights and/or biases. The input data values, output data values, weights and biases of a DNN may collectively be referred to as the network parameters of the DNN.

Hardware (e.g. a DNN accelerator) for implementing a DNN comprises hardware logic that can be configured to process input data to the DNN in accordance with the layers of the DNN. Specifically, hardware for implementing a DNN comprises hardware logic that can be configured to process the input data to each layer in accordance with that layer and generate output data for that layer which either becomes the input data to another layer or becomes the output of the DNN. For example, if a DNN comprises a convolution layer followed by an activation layer, hardware logic that can be configured to implement that DNN comprises hardware logic that can be configured to perform a convolution on the input data to the DNN using the weights and biases associated with that convolution layer to produce output data for the convolution layer, and hardware logic that can be configured to apply an activation function to the input data to the activation layer (i.e. the output data of the convolution layer) to generate output data for the DNN.

As is known to those of skill in the art, for hardware to process a set of values each value is represented in a number format. Two common types of number formats are fixed point number formats and floating point number formats. As is known to those skilled in the art, a fixed point number format has a fixed number of digits after the radix point (e.g. decimal point or binary point). In contrast, a floating point number format does not have a fixed radix point (i.e. it can "float"). In other words, the radix point can be placed in multiple places within the representation. While representing the network parameters of a DNN in a floating point number format may allow more accurate or precise output data to be produced, processing network parameters in a floating point number format in hardware is complex which tends to increase the silicon area, power consumption, memory and bandwidth consumption, and complexity of the hardware compared to hardware that processes network parameters in other formats, such as, but not limited to, fixed point number formats. Accordingly, hardware for implementing a DNN may be configured to represent the network parameters of a DNN in another format, such as a fixed point number format, to reduce the area, power consumption, memory and bandwidth consumption, and complexity of the hardware logic.

Generally the fewer bits that are used to represent the network parameters of a DNN (e.g. input data values, weights, biases, and output data values), the more efficiently the DNN can be implemented in hardware. However, typically the fewer bits that are used to represent the network parameters of a DNN (e.g. input data values, weights, biases, and output data values) the less accurate the DNN becomes. Accordingly it is desirable to identify number formats for representing the network parameters of the DNN that balance the number of bits used to represent the network parameters and the accuracy of the DNN.

The embodiments described below are provided by way of example only and are not limiting of implementations which solve any or all of the disadvantages of methods and systems for identifying number formats for representing the network parameters of a DNN.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods of determining a number format for representing a set of two or more network parameters of a Deep Neural Network “DNN” for use in configuring hardware logic to implement the DNN. The method includes: determining a sensitivity of the DNN with respect to each network parameter in the set of network parameters; for each candidate number format of a plurality of candidate number formats: determining a quantisation error associated with quantising each network parameter in the set of network parameters in accordance with the candidate number format; generating an estimate of an error in an output of the DNN caused by quantisation of the set of network parameters based on the sensitivities and the quantisation errors; generating a local error based on the estimated error; and selecting the candidate number format of the plurality of candidate number formats with the minimum local error as the number format for the set of network parameters.

A first aspect provides a computer-implemented method of determining a number format for representing a set of two or more network parameters of a Deep Neural Network “DNN” for use in configuring hardware logic to implement the DNN, the method comprising: determining a sensitivity of the DNN with respect to each network parameter in the set of network parameters; for each candidate number format of a plurality of candidate number formats: determining a quantisation error associated with quantising each network parameter in the set of network parameters in accordance with the candidate number format; generating an estimate of an error in an output of the DNN caused by quantisation of the set of network parameters based on the sensitivities and the quantisation errors; and generating a local error based on the estimated error; and selecting the candidate number format of the plurality of candidate number formats with the minimum local error as the number format for the set of network parameters.

Determining the sensitivity of the DNN with respect to a network parameter may comprise: determining an output of a model of the DNN in response to test data; determining a partial derivative of one or more values based on the output of the DNN with respect to the network parameter; and determining the sensitivity from the one or more partial derivatives.

The one or more partial derivatives may be determined by a back-propagation technique.

The model of the DNN may be a floating point model of the DNN.

The output of the DNN may comprise a single value and the one or more values based on the output of the DNN may comprise the single output value.

The output of the DNN may comprise a plurality of values and the one or more values based on the output of the DNN may comprise each of the plurality of output values.

The output of the DNN may comprise a plurality of values and the one or more values based on the output of the DNN may comprise a single summary value based on the plurality of output values.

The summary value may be a sum of the plurality of output values.

The summary value may be a maximum of the plurality of output values.

Generating the estimate of the error in the output of the DNN caused by quantisation of the set of network parameters may comprise calculating a weighted sum of the quantisation errors wherein the weight associated with a quantisation error for a network parameter is the sensitivity of the DNN with respect to that network parameter.

Generating the estimate of the error in the output of the DNN caused by quantisation of the set of network parameters may comprise calculating an absolute value of a weighted sum of the quantisation errors wherein the weight associated with a quantisation error for a network parameter is the sensitivity of the DNN with respect to that network parameter.

Generating the estimate of the error in the output of the DNN caused by quantisation of the set of network parameters may comprise: (i) calculating, for each network parameter in the set, the absolute value of the product of the quantisation error for that network parameter and the sensitivity of the DNN with respect to that network parameter; and (ii) calculating a sum of the absolute values.

Generating the estimate of the error in the output of the DNN caused by quantisation of the set of network parameters may comprise: (i) calculating, for each network parameter, the square of the quantisation error for that network parameter; (ii) calculating, for each network parameter, the product of the square of the quantisation error for that network parameter, and the absolute value of the sensitivity of the DNN with respect to that network parameter; and (iii) calculating a sum of the products.

Each candidate number format may be defined by a bit width and an exponent.

The plurality of candidate number formats may have the same bit width and different exponents.

Each candidate number format may be defined by a bit width. At least two of the candidate number formats may have different bit widths. The local error may be further based on a size parameter.

The size parameter may be based on a number of bits to represent the network parameters in the set when the network parameters in the set are quantised in accordance with the candidate number format.

The set of network parameters may be one of: all or a portion of input data values for a layer of the DNN; all or a portion of weights for a layer of the DNN; all or a portion of biases of a layer of the DNN; and all or a portion of output data values of a layer of the DNN.

The method may further comprise configuring hardware logic to implement the DNN using the selected number format by configuring the hardware logic to receive and process the set of network parameters in accordance with the selected number format.

The local error may be the estimated error or a combination of the estimated error and a size parameter, the size parameter reflecting a size of the network parameters in the set of network parameters when quantised in accordance with the candidate number format A second aspect provides a method of determining number formats for representing network parameters of a Deep Neural Network "DNN" for use in configuring hardware logic to implement the DNN, the method comprising: dividing the network parameters of the DNN into a plurality of sets of network parameters, each set comprising two or more network parameters; and executing the method of the first aspect for each set of network parameters.

Each set of network parameters may comprise all or a portion of input data values to a layer of the DNN; all or a portion of biases to a layer of the DNN; or all or a portion of weights to a layer of the DNN.

A third aspect provides a computing-based device for determining a number format for representing a set of two or more network parameters of a Deep Neural Network "DNN" for use in configuring hardware logic to implement the DNN, the computing-based device comprising: at least one processor; and memory coupled to the at least one processor, the memory comprising computer readable code that when executed by the at least one processor causes the at least one processor to: determine a sensitivity of the DNN with respect to each network parameter in the set of network parameters; for each candidate number format of a plurality of candidate number formats: determine a quantisation error associated with quantising each network parameter in the set of network parameters in accordance with the candidate number format; generate an estimate of an error in an output of the DNN caused by quantisation of the set of network parameters based on the sensitivities and the quantisation errors; generate a local error based on the estimated error; and select the candidate number format with the minimum local error as the number format for the set of network parameters.

The hardware logic configurable to implement a DNN (e.g. DNN accelerator) may be embodied in hardware on an integrated circuit. There may be provided a method of manufacturing, at an integrated circuit manufacturing system, the hardware logic configurable to implement a DNN (e.g. DNN accelerator). There may be provided an integrated circuit definition dataset that, when processed in an integrated circuit manufacturing system, configures the system to manufacture the hardware logic configurable to implement a DNN (e.g. DNN accelerator). There may be provided a non-transitory computer readable storage medium having stored thereon a computer readable description of hardware logic configurable to implement a DNN (e.g. DNN accelerator) that, when processed in an integrated circuit manufacturing system, causes the integrated circuit manufacturing system to manufacture an integrated circuit embodying hardware logic configurable to implement a DNN (e.g. DNN accelerator).

There may be provided an integrated circuit manufacturing system comprising: a non-transitory computer readable storage medium having stored thereon a computer readable description of hardware logic configurable to implement a DNN (e.g. DNN accelerator); a layout processing system configured to process the computer readable description so as to generate a circuit layout description of an integrated circuit embodying the hardware logic configurable to implement a DNN (e.g. DNN accelerator); and an integrated circuit generation system configured to manufacture the hardware logic configurable to implement a DNN (e.g. DNN accelerator) according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
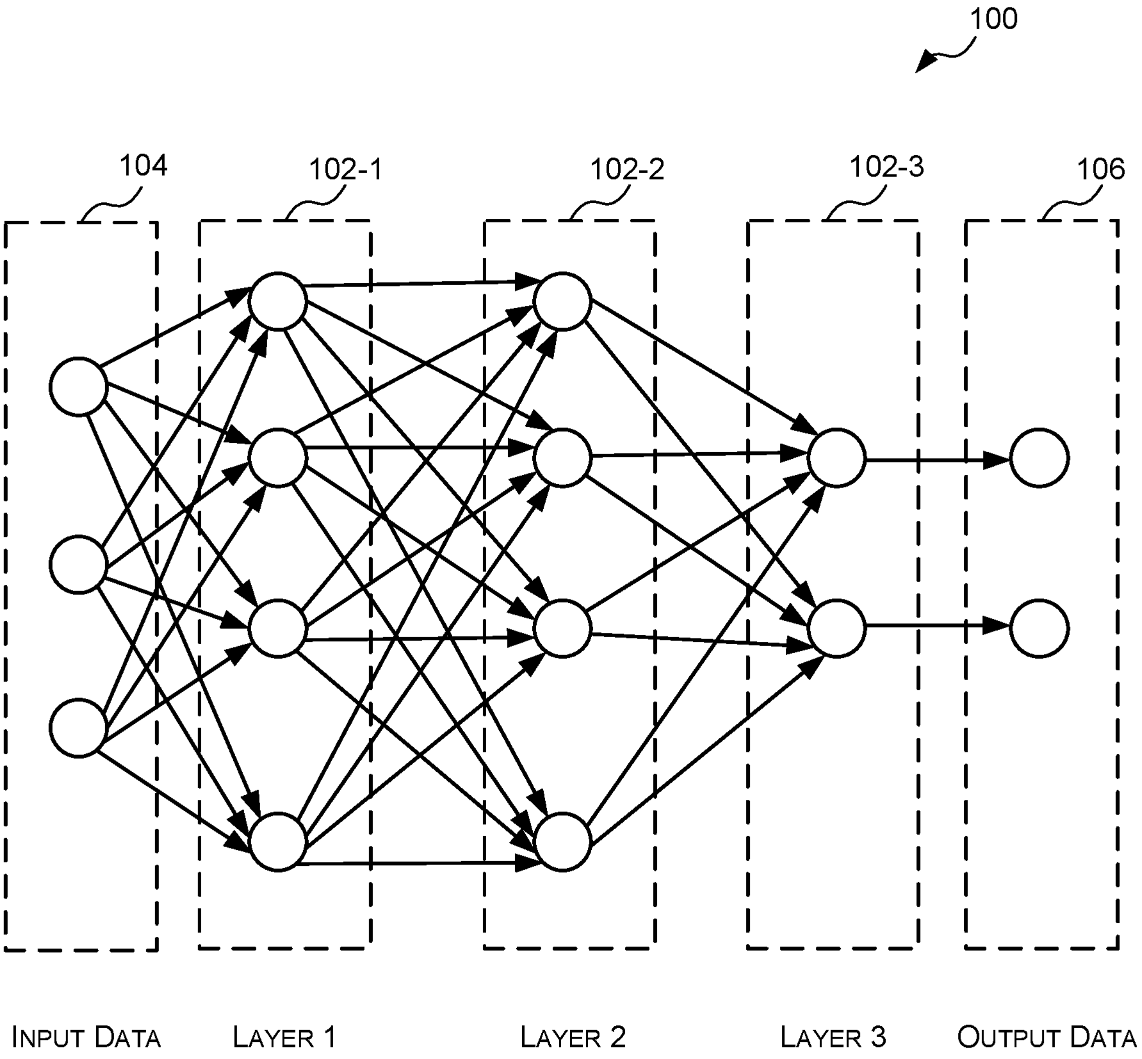
FIG. 1 is a schematic diagram of an example deep neural network (DNN)
Figure 2:
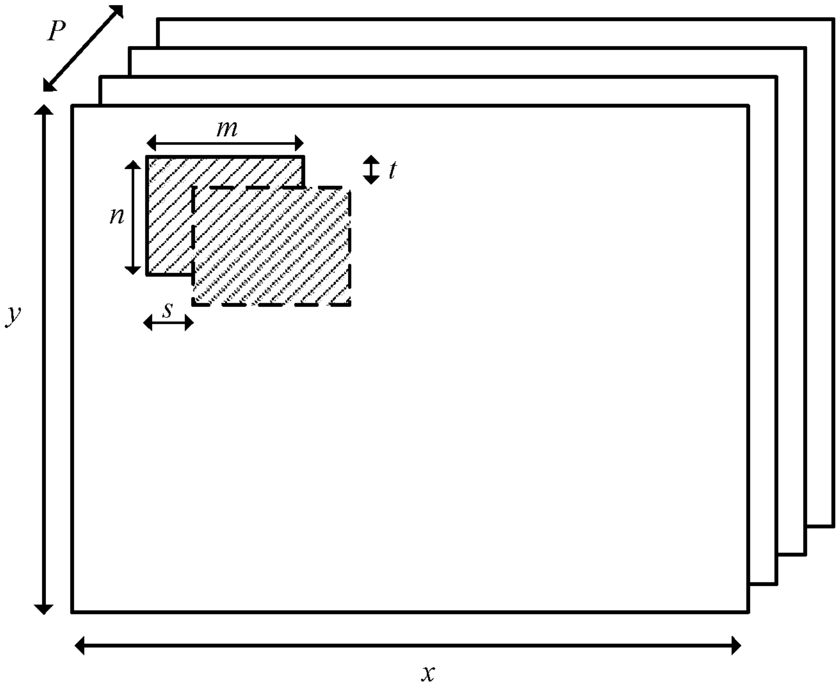
FIG. 2 is a schematic diagram of example data in a DNN.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, while representing the network parameters of a DNN in a floating point number format may allow more accurate or precise output data to be produced by the DNN, processing network parameters in a floating point number format in hardware is complex which tends to increase the silicon area, power consumption, memory and bandwidth consumption, and complexity of the hardware compared to hardware that processes network parameters in other formats, such as, but not limited to, fixed point number formats. Accordingly, hardware for implementing a DNN, such as a DNN accelerator, may be configured to represent and process the network parameters of a DNN in another number format, such as a fixed point number format, to reduce the area, power consumption, memory and bandwidth consumption, and complexity of the hardware logic.

There are a plurality of different types of number formats. Each number format type defines the parameters that form a number format of that type and how the parameters are interpreted. For example, one example number format type may specify that a number or value is represented by a b-bit mantissa m and an exponent exp and the number is equal to $m*2^{exp}$. As described in more detail below, some number format types can have configurable parameters, which may also be referred to as quantisation parameters, that can vary between number formats of that type. For example, in the example number format described above the bit width b and the exponent exp may be configurable. Accordingly, a first number format of that type may use a bit width b of 4 and an exponent exp of 6, and a second, different, number format of that type may use a bit width b of 8 and an exponent exp of −3.

Generally, the fewer bits that can be used to represent the network parameters of a DNN (e.g. input data values, weights, biases, and output data values), the more efficiently the DNN can be implemented in hardware. However, typically the fewer bits that are used to represent the network parameters of a DNN (e.g. input data values, weights, biases, and output data values) the less accurate the DNN becomes. Accordingly it is desirable to identify number formats for representing the network parameters of the DNN that balance the number of bits used to represent the network parameters and the accuracy of the DNN.

The accuracy of a quantised DNN (i.e. a version of the DNN in which at least a portion of the network parameters are represented by a non-floating point number format) may be determined by comparing the output of such a DNN in response to input data to a baseline or target output. The baseline or target output may be the output of an unquantised version of the DNN (i.e. a version of the DNN in which all of the network parameters are represented by a floating point number format, which may as be referred to herein as a floating point version of the DNN or a floating point DNN) in response to the same input data or the ground truth output for the input data. The further the output of the quantised DNN is from the baseline or target output, the less accurate the quantised DNN. The size of a quantised DNN may be determined by the number of bits used to represent the network parameters of the DNN. Accordingly, the lower the bit depths of the number formats used to represent the network parameters of a DNN, the smaller the DNN.

While all the network parameters (e.g. input data values, weight, biases and output data values) of a DNN may be represented using a single number format this does not generally produce a DNN that is small in size and accurate. This is because different layers of a DNN tend to have different ranges of values. For example, one layer may have input data values between 0 and 6 whereas another layer may have input data values between 0 and 500. Accordingly, using a single number format may not allow either set of input data values to be represented efficiently or accurately. As a result, the network parameters of a DNN may be divided into sets of network parameters and a number format may be selected for each set. Preferably each set of network parameters comprises related or similar network parameters. As network parameters of the same type for the same layer tend to be related, each set of network parameters may be all or a portion of a particular type of network parameter for a layer. For example, each set of network parameters may be all, or a portion of the input data values of a layer; all or a portion of the weights of a layer; all or a portion of the biases of a layer; or all or a portion of the output data values of a layer. Whether or not a set of network parameters comprises all, or only a portion, of the network parameters of a particular type for a layer may depend on the hardware that is to implement the DNN. For example, some hardware that can be used to implement a DNN may only support a single number format per network parameter type per layer, whereas other hardware that can be used to implement a DNN may support multiple number formats per network parameter type per layer.

Hardware for implementing a DNN, such as a DNN accelerator, may support one type of number format for the network parameters. For example, hardware for implementing a DNN may support number formats wherein numbers are represented by a b-bit mantissa and an exponent exp. To allow different sets of network parameters to be represented using different number formats hardware for implementing a DNN may use a type of number format that has one or more configurable parameters, wherein the parameters are shared between all values in a set. These types of number formats may be referred to herein as block-configurable types of number formats or set-configurable types of number formats. Accordingly, non-configurable formats such as INT32 and floating point number formats are not block-configurable types of number formats. Example block-configurable types of number formats are described below.

Example Block-Configurable Types of Number Formats

One example block-configurable type of number format which may be used to represent the network parameters of a DNN is the Q-type format, which specifies a predetermined number of integer bits a and fractional bits b. Accordingly, a number can be represented as Qa.b which requires a total of a+b+1 bits (including the sign bit). Example Q-type formats are illustrated in Table 1 below. The quantisation parameters for the Q-type format are the number of integer bits a and the number of fractional bits b.

TABLE 1

| Q Format | Description | Example |
|---|---|---|
| Q4.4 | 4 integer bits and 4 fractional bits | $0110.1110_2$ |
| Q0.8 | 0 integer bits and 8 fractional bits | $.01101110_2$ |

Another example block-configurable type of number format which may be used to represent network parameters of a DNN is one in which number formats of this type are defined by a fixed integer exponent exp and a b-bit mantissa m such that a value u is equal to $u=2^{exp}m$. In some cases, the mantissa m may be represented in two's complement format. However, in other cases other signed or unsigned integer formats may be used. In these cases, the exponent exp and the number of mantissa bits b only need to be stored once for a set of values represented in that number format. Different number formats of this type may have different mantissa bit lengths b and/or different exponents exp thus the quantisation parameters for this type of number format comprise the mantissa bit length b (which may also be referred to herein as a bit width, bit depth or bit length), and the exponent exp.

A final example block-configurable type of number format which may be used to represent the network parameters of a DNN is the 8-bit asymmetric fixed point (Q8A) type format. In one example, number formats of this type comprise a minimum representable number $r_{min}$, a maximum representable number $r_{max}$, a zero point z, and an 8-bit number $d_{Q8A}$ for each value in a set which identifies a linear interpolation factor between the minimum and maximum representable numbers. In other cases, a variant of this type of format may be used in which the number of bits used to store the interpolation factor $d_{QbA}$ is variable (e.g. the number of bits b used to store the interpolation factor may be one of a plurality of possible integers). In this example, the Q8A type format or a variant of the Q8A type format may approximate a floating point value $d_{float}$ as shown in equation (1) where b is the number of bits used by the quantised representation (i.e. 8 for the Q8A format) and z is the quantised zero point which will always map exactly back to 0. The quantisation parameters for this example type of number format comprise the maximum representable number or value $r_{max}$, the minimum representable number or value $r_{min}$, the quantised zero point z, and optionally, the mantissa bit length b (i.e. when the bit length is not fixed at 8).

$$d_{float} = \frac{(r_{max} - r_{min})(d_{QbA} - z)}{2^b - 1} \tag{1}$$

In another example, the Q8A type format comprises a zero point z which will always map exactly to 0, a scale factor scale and an 8-bit number $d_{Q8A}$ for each value in the set. In this example a number format of this type approximates a floating point value $d_{float}$ as shown in equation (2). Similar to the first example Q8A type format, in other cases the number of bits for the integer or mantissa component may be variable. The quantisation parameters for this example type of number format comprise the zero point z, the scale scale, and optionally, the mantissa bit length b.

$$d_{float} = (d_{Q8A} - z) * \text{scale} \tag{2}$$

Determining a number format of a specific block-configurable type of number format may be described as identifying the one or more quantisation parameters for the type of number format. For example, determining a number format of a number format type defined by a b-bit mantissa and an exponent exp may comprise identifying the bit width b of the mantissa and/or the exponent exp.

Number Format Selection Methods

Several methods have been developed for identifying number formats for representing network parameters of a DNN. One simple method (which may be referred to herein as the full range method or the minimum/maximum method) for selecting a number format for representing a set of network parameters of a DNN may comprise selecting, for a given mantissa bit depth b (or a given exponent exp), the smallest exponent exp (or smallest mantissa bit depth b) that covers the range for the expected set of network parameters x for a layer. For example, for a given mantissa bit depth b, the exponent exp can be chosen in accordance with equation (3) such that the number format covers the entire range of x where $\lceil \cdot \rceil$ is the ceiling function:

$$\exp = \lceil \log_2(\max(|x|)) \rceil - b + 1 \tag{3}$$

However, such a method is sensitive to outliers. Specifically, where the set of network parameters x has outliers, precision is sacrificed to cover the outliers. This may result in large quantisation errors (e.g. the error between the set of network parameters in a first number format (e.g. floating point number format) and the set of network parameters in the selected number format). As a consequence, the error in the output data of the layer and/or of the DNN caused by the quantisation, may be greater than if the number format covered a smaller range, but with more precision.

Another method (which may be referred to as the weighted outlier method) is described in the Applicant's GB Patent Application No. 1718293.2, which is herein incorporated by reference in its entirety. In the weighted outlier method the number format for a set of network parameters is selected from a plurality of potential number formats based on the weighted sum of the quantisation errors when a particular number format is used, wherein a constant weight is applied to the quantisation errors for network parameters that fall within the representable range of the number format and a linearly increasing weight is applied to the quantisation errors for the values that fall outside the representable range.

Yet another method (which may be referred to as the back-propagation method) is described in the Applicant's GB Patent Application No. 1821150.8, which is herein incorporated by reference in its entirety. In the back-propagation method the quantisation parameters that produce the best cost (e.g. a combination of DNN accuracy and DNN size (e.g. number of bits)) are selected by iteratively determining the gradient of the cost with respect to each quantisation parameter using back-propagation, and adjusting the quantisation parameters until the cost converges. This method can produce good results (e.g. a DNN that is small in size (in terms of number of bits), but is accurate), however it can take a long time to converge.

Finally, another method (which may be referred to as the end-to-end method) is described in the Applicant's GB Patent Application No. 1718289.0, which is herein incorporated by reference in its entirety. In the end-to-end method the number formats for the network parameters of a DNN are selected one layer at a time according to a predetermined sequence wherein any layer is preceded in the sequence by the layer(s) on which it depends. The number format for a set of network parameters for a layer is selected from a plurality of possible number formats based on the error in the output of the DNN when each of the plurality of possible number formats is used to represent the set of network parameters. Once the number format(s) for a layer has/have been selected any calculation of the error in the output of the DNN for a subsequent layer in the sequence is based on the network parameters of that layer being represented using the selected number format(s). This may be quicker (e.g. it may produce a set of number formats for a DNN faster) than the back-propagation method, but it is not quite as accurate although it is more accurate than the minimum/maximum method and the weighted outlier method.

These methods can be divided into two groups—those, such as the minimum/maximum method and the weighted outlier method, that are easy to implement and can identify a set of number formats for the network parameters of a DNN quickly, but may provide sub-optimal results in terms of size and accuracy; and those, such as the back-propagation method and the end-to-end method, that are more complex to implement and take more time to identify a set of number formats for the network parameters of DNN, but produce a better DNN (e.g. a DNN that is small in size but accurate). Accordingly, there is a need for a method of selecting number formats for the network parameters of a DNN that can produce a set of number formats quickly, but can also produce a good DNN (e.g. a DNN that is small in size but accurate).

Accordingly, described herein are methods and systems for identifying a number format for representing a set of network parameters of a DNN wherein the number format is selected as the candidate number format of a plurality of candidate number formats that minimizes a local error. The local error is based on an estimate of the error in the output of the DNN caused by quantisation of the set of network parameters, wherein the estimate of the error in the output of the DNN caused by the quantisation of the set of network parameters is based on the quantisation error of each network parameter in the set and the sensitivity of the DNN to each of the network parameters in the set. As described in more detail below, the sensitivity of the DNN to a particular network parameter indicates the importance, influence, or significance of the particular network parameter to the output of the DNN, and is therefore an indication of how much a perturbation of a particular network parameter is likely to affect the error in the output of the DNN.

Estimating the error in the output of the DNN caused by, or attributed to, quantisation of a set of network parameters based on sensitivity and quantisation error has proved to be an accurate method of estimating the error. In particular, in general the higher the magnitude of the quantisation error for a network parameter the greater the error in the output of the DNN (and thus the poorer the accuracy of the DNN). However, not all network parameters contribute to the output equally. Specifically, some network parameters will have more effect on the output than other network parameters. Accordingly, estimating the error in the output of the DNN caused by, or attributed to, quantisation of a set of network parameters from both sensitivity and quantisation errors, instead of solely from the quantisation errors, can produce a more accurate estimate of the error associated with quantising the set of network parameters.

Figure 4:
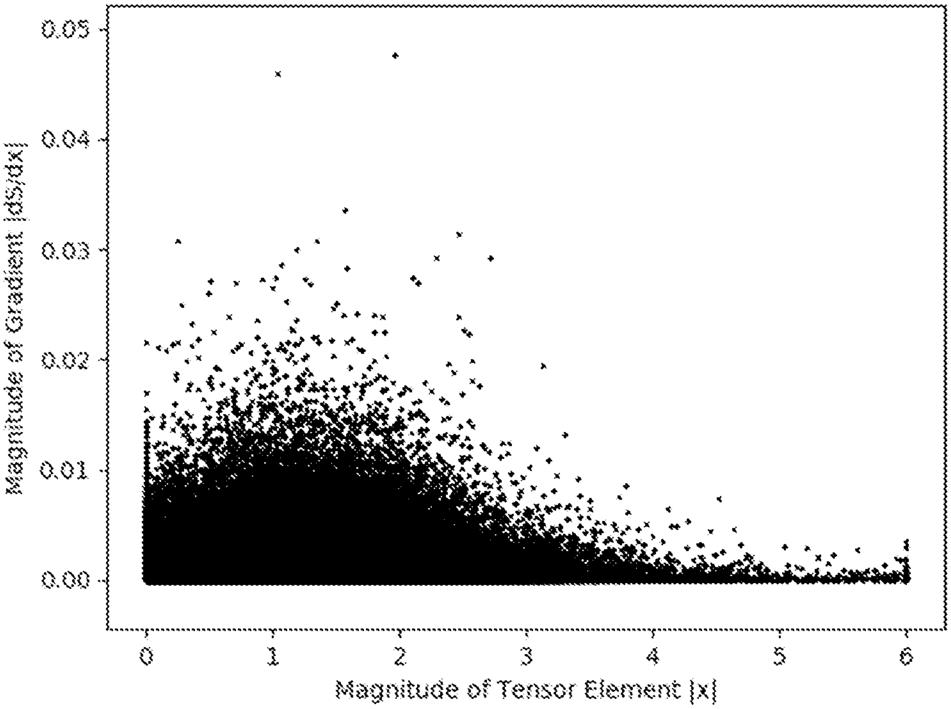
FIG. 4 is a graph of sensitivity versus magnitude for a set of data values output by a ReLU-6 activation operating on the output of a convolution layer of a MobileNet v1 CNN.
Figure 5:
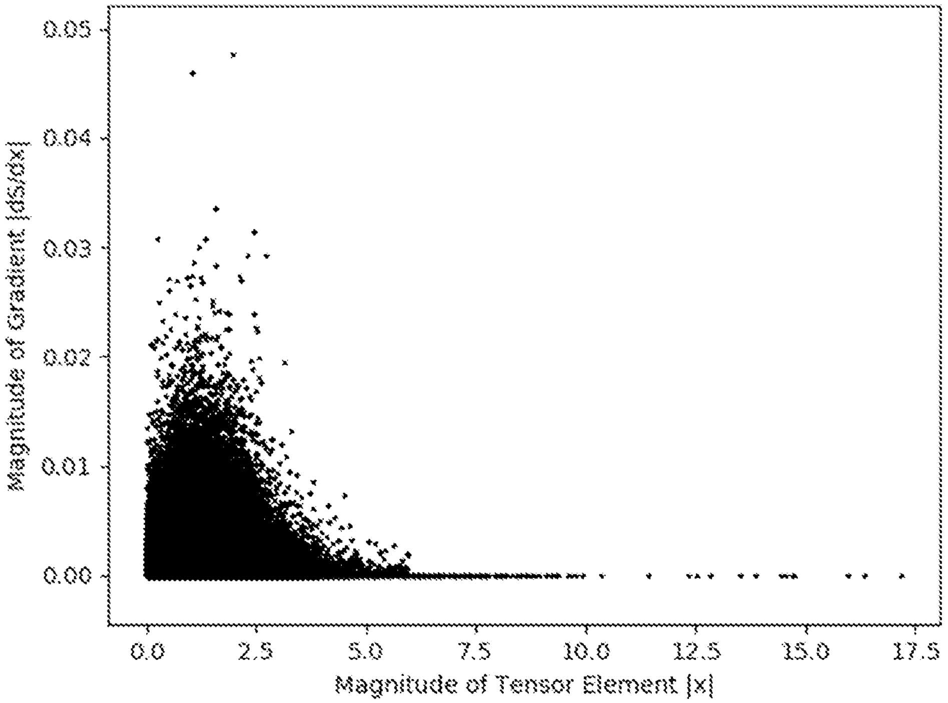
FIG. 5 is a graph of sensitivity versus magnitude for a set of data values output by the convolution layer of the MobileNet v1 CNN.

For example, reference is now made to FIGS. 4 to 7 which show plots of sensitivity against magnitude for various network parameters for a MobileNet v1 convolutional neural network (CNN). As is known to those of skill in the art, MobileNet is a CNN for Image Classification and Mobile Vision. MobileNet v1 comprises hard sigmoid activation layers (ReLU-6) that clamp the received input data values to the range [0,6]. FIG. 4 shows a plot of sensitivity versus magnitude for the output data values of a ReLU-6 activation layer (which become the input data values of another layer). The magnitude of the output data values is constrained between 0 and 6 with a strong peak at 0 and FIG. 4 shows that small values appear to be more sensitive on average than large values. FIG. 5 shows a plot of sensitivity versus magnitude for the input data values of the ReLU-6 activation layer of FIG. 4. Although there are a large number of input data values that are larger than 6, which is the clipping point of the activation layer, it can be seen from FIG. 5 that those input data values that are larger than 6 are effectively irrelevant in the final output since the sensitivity is zero. Accordingly, a purely magnitude-based format selection method (such as the minimum/maximum method and the weighted outlier method) would select or identify a number format for this set of input data values that covers a larger range than the required [0,6] range sacrificing precision for range. However, by taking sensitivity into account in selecting a number format the input data values that will be clipped by the activation layer can be discounted. The person of skill in the art will understand that the same effect seen with respect to a ReLU-6 activation layer is likely to be seen for other "flattening" layers such as, but not limited to, sigmoid and tanh activation layers.

Figure 6:
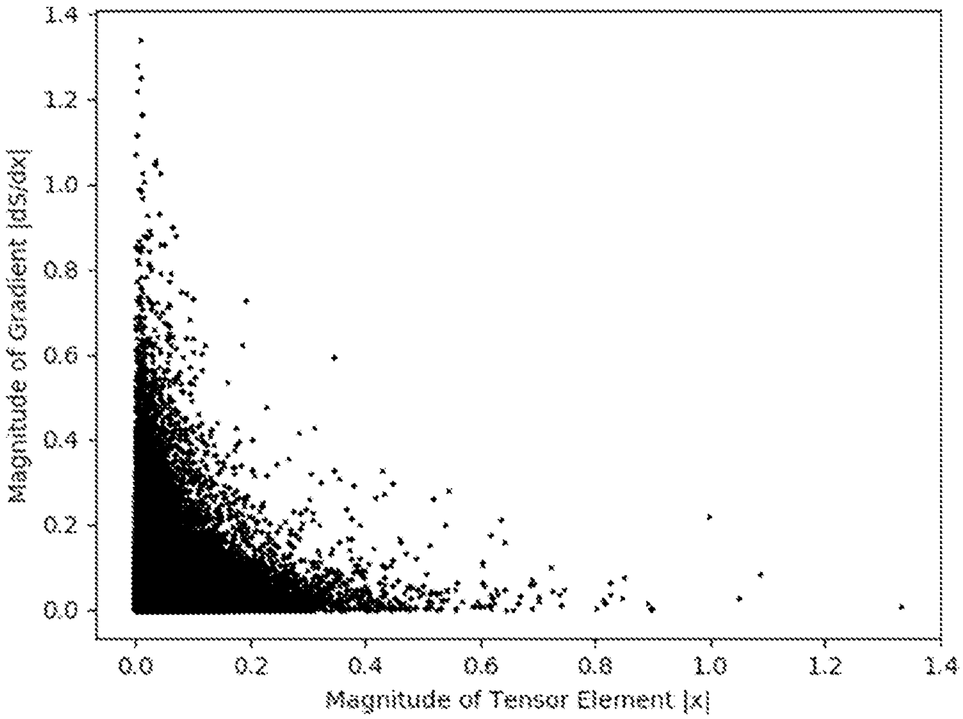
FIG. 6 is a graph of sensitivity versus magnitude for a set of weights for the convolution layer of the MobileNet v1 CNN.

FIG. 6 shows a plot of sensitivity versus magnitude for the weights of a convolution layer immediately prior to the ReLU-6 activation layer of FIGS. 4 and 5. In MobileNet v1 some layers have weights with a strong peak around zero and long tail consisting of relatively few weights. Whether to preserve or clip these weights depends on the sensitivity of the output relative to the other weights. In the example of FIG. 6 the most sensitive weights appear to be concentrated around zero, and the long tail consists of seemingly unimportant weights. This would suggest that the outliers can safely be clipped to devote more precision to the weights near zero.

Figure 7:
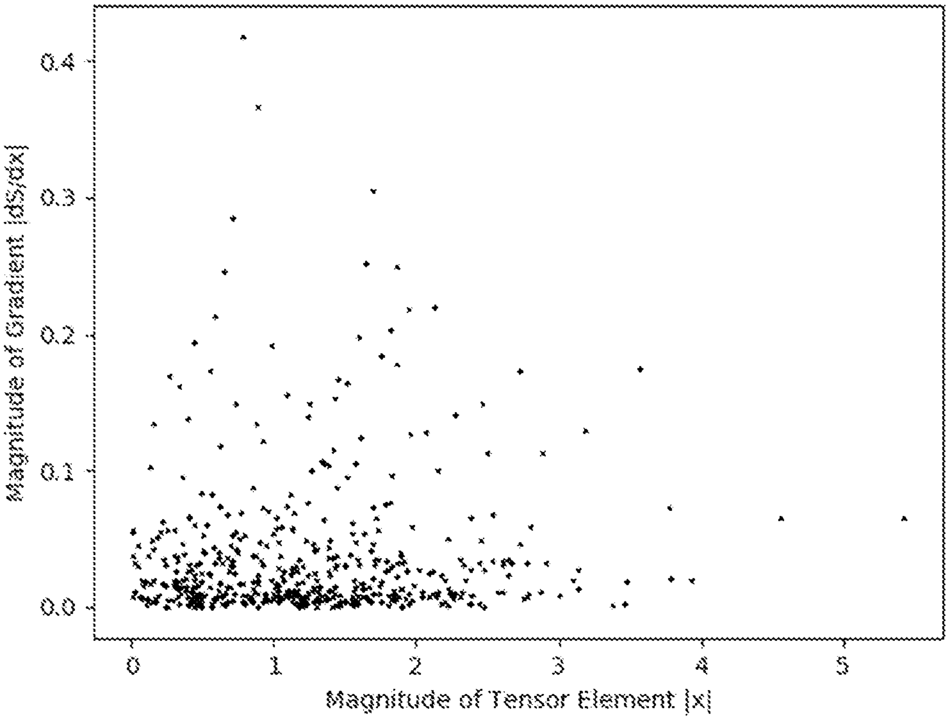
FIG. 7 is a graph of sensitivity versus magnitude for a set of biases for the convolution layer of the MobileNet v1 CNN.

FIG. 7 shows a plot of sensitivity versus magnitude for the biases of the convolution layer of FIG. 6. In MobileNet v1 the convolution layers tend to have biases that appear to be scattered more uniformly than the weights.

Accordingly it can be seen from FIGS. 4 to 7 that there is not a particularly consistent relationship between the sensitivity of a network parameter and the magnitude of the network parameter. In fact, the network parameters for different layers have quite different joint distributions. Therefore, sensitivity provides information that is pertinent to selecting an appropriate number format that cannot be inferred from magnitude alone, and thus using sensitivity to identify number formats for network parameters can improve on previous magnitude-based methods such as the minimum/maximum method and the weighted outlier method. Specifically, in the methods described herein the network parameters which strongly affect or influence the output of the DNN are referred to as 'sensitive' and number formats are chosen from the sensitivity and quantisation error so that the largest quantisation errors are incurred for the least sensitive network parameters and conversely those with high sensitivity are preserved with as low a quantisation error as possible.

Furthermore, estimating the error in the output of the DNN caused by quantisation of the set of network parameters based on quantisation error and sensitivity means that, unlike the end-to-end and back-propagation methods, the output of the DNN does not have to be determined or evaluated multiple times. Specifically, the sensitivity can be determined from a single forward pass of the DNN and, as described in more detail below, from a single backward pass. Accordingly, the described methods allow number formats to be identified quickly and efficiently.

Error Estimated from Sensitivity and Quantisation Error

An explanation will now be provided as to why the error in the output of the DNN related to quantisation of a set of network parameters to a particular number format can be accurately estimated using the sensitivity of the DNN with respect to the network parameters in the set and the quantisation error associated with quantising the network parameters to the particular number format. Specifically, without loss of generality, let a differentiable function $f(x)$ represent the DNN. By the first order Taylor series expansion an approximation of the output of the function after a small perturbation $\Delta x$ of the input x is given by equation (4):

$$f(x+\Delta x) \approx f(x) + \Delta x \frac{df}{dx} \tag{4}$$

Rearranging equation (4), an approximation of the size or magnitude of the perturbation in the output is given by equation (5):

$$f(x+\Delta x) - f(x) \approx \Delta x \frac{df}{dx} \tag{5}$$

Where the function is a function of multiple variables with multiple outputs equation (5) becomes equation (6) where the total size of the perturbation in the $j^{th}$ output related to a perturbation of a set of variables is given by the sum of the perturbations in the $j^{th}$ output caused by each variable $x_i$:

$$f_j(x+\Delta x) - f_j(x) \approx \sum_i \Delta x_i \frac{\partial f_j}{\partial x_i} \tag{6}$$

As is known to those of skill in the art (and described in more detail below), quantisation rounds a network parameter x in a first number format to a representable number q (x, F) of another number format F. The number format F is defined by one or more quantisation parameters. As described above, different types of number formats may be defined by different quantisation parameters. For example, as described above, a Q-type format is defined by the number of integer bits and the number of fractional bits; and another format type may be defined by an exponent exp and a bit width b. Quantisation introduces an error between the original network parameter x and the quantised network parameter q (x, F) which can be considered a perturbation of the original value as shown in equation (7):

$$\Delta x = q(x, F) - x \tag{7}$$

Then from equation (6) the estimate of the error in the $j^{th}$ output of a DNN caused by the quantisation of a set of N network parameters can be written as shown in equation (8).

$$f_j(q(x, F)) - f_j(x) \approx \sum_{i=1}^{N} (q(x_i, F) - x_i) \frac{\partial f_j}{\partial x_i} \tag{8}$$

Accordingly an estimate of the error in the $j^{th}$ output of a DNN caused by the quantisation of a set of network parameters to a number format F can be determined from (i) the quantisation error $(q(x_i, F)-x_i)$ associated with quantising each of the network parameters in the set to the number format; and (ii) the partial derivative of the $j^{th}$ output with respect to each of the values in the set $$\left(\frac{\partial f_j}{\partial x_i}\right).$$

The partial derivative of a function with respect to a variable or value may also be referred to as the gradient of the function with respect to the variable or value.

The total error in the output caused by quantisation of a set of network parameters may then be estimated as the sum of the error in each output caused by the quantisation of a set of network parameters as shown in equation (9):

$$\sum_j f_j(q(x, F)) - f_j(x) \approx \sum_j \sum_{i=1}^{N} (q(x_i, F) - x_i) \frac{\partial f_j}{\partial x_i} \tag{9}$$

Calculating the partial derivatives in equation (9) for each value in a set amounts to calculating the Jacobian matrix J of the function f which is shown in equation (10). As is known to those of skill in the art, the Jacobian matrix of a function of multiple variables with multiple outputs is the matrix of all its first order partial derivatives. In some cases, it may be difficult to efficiently calculate the full Jacobian matrix due to its computation and memory requirements, particularly for DNNs with a large number of outputs (e.g. 1,000 outputs or more). Definitions of sensitivity analogous to those presented below may be based on an explicit calculation of the Jacobian matrix; however, for reasons of efficiency and practicality it is often preferable to summarise it in some manner.

$$J = \begin{bmatrix} \frac{\partial f_1}{\partial x_1} & \cdots & \frac{\partial f_1}{\partial x_N} \\ \vdots & \ddots & \vdots \\ \frac{\partial f_M}{\partial x_1} & \cdots & \frac{\partial f_M}{\partial x_N} \end{bmatrix} \tag{10}$$

One such method of avoiding computation of J is to rearrange equation (9) as shown in equation (11), and defining the sensitivity $s_i$ of the network parameter $x_i$ with respect to the network outputs as the sum of partial derivatives as shown in equation (12). This is an example of a use of a summary S of the network outputs; $f$ has here been summarised by the summation $S=\Sigma_j f_j$ so that $$s_i = \frac{\partial S}{\partial x_i},$$

which leads to equation (13).

$$\sum_j f_j(q(x, F)) - f_j(x) \approx \sum_{i=1}^{N} (q(x_i, F) - x_i) \sum_j \frac{\partial f_j}{\partial x_i} \tag{11}$$

$$s_i = \sum_j \frac{\partial f_j}{\partial x_i} = \frac{\partial \sum_j f_j}{\partial x_i} \tag{12}$$

$$\sum_j f_j(q(x, F)) - f_j(x) \approx \sum_{i=1}^{N} (q(x_i, F) - x_i) \frac{\partial S}{\partial x_i} = \sum_{i=1}^{N} (q(x_i, F) - x_i) s_i \tag{13}$$

S may be defined in any suitable manner from the outputs $f_j$ of the DNN. In some cases, S may be the sum of the outputs of the DNN as shown in equation (14). The advantage of calculating S as set out in equation (14) is that S takes into account all of the outputs of the DNN. However, calculating S as set out in equation (14) may not work well, for example, where the outputs of the DNN (e.g. SoftMax outputs) are normalized such that all the outputs always sum to a constant. In such cases, the theoretical gradient of S is 0. Accordingly, in other cases, S may be the maximum of the outputs as shown in equation (15). This method of calculating S avoids the issue with normalized outputs that equation (14) has and has proven to produce good results (e.g. a DNN that is small in size, but accurate) for classification networks in particular. However, calculating S in accordance with equation (15) may not be suitable for DNNs where the output is not dominated by the largest output value, such as, but not limited to, image regression DNNs. It will be evident to a person of skill in the art that these are example methods of calculating S and that S may be calculated in any suitable manner from the outputs $f_j$ of the DNN.

$$S = \sum_j f_j \tag{14}$$

$$S = \max_j f_j \tag{15}$$

Accordingly, to minimise the error in the output of the DNN due to quantisation of a set of network parameters the best number format to quantise the set of network parameters can be selected as the number format that minimises a local error E that is based on an estimate G of the error in the output, wherein the estimate G is based on the quantisation error and sensitivity of the network parameters in the set. The local error E can be expressed as shown in equation (16) and the selection of the number format as the number format that minimises the local error E is expressed in equation (17):

$$E(F) = G(q(x, F) - q(x), s(x)) \tag{17}$$

$$F^* = \mathrm{argmin}_F E(F) \tag{18}$$

The estimate of the error G may be calculated in any suitable manner from the quantisation errors and the sensitivities. For example, the estimated error G may be calculated in accordance equation (13) or a variant thereof. In some examples, the estimate of the error G may be calculated as the absolute value of the error estimate calculated in accordance with equation (13). In other words, G may be equal to the absolute value of the weighted sum of the quantisation errors, wherein the weight for a particular quantisation error is equal to the sensitivity of the DNN to the corresponding network parameter This is expressed by equation (18). In other examples, the estimate of the error G may be calculated by (i) calculating, for each network parameter in the set, the absolute value of the product of the quantisation error for that network parameter and the sensitivity of the DNN with respect to that network parameter; and (ii) calculating the sum of the absolute values. This is expressed by equation (19). In yet other examples, the estimate of the error G may be calculated by (i) calculating, for each network parameter, the square of the quantisation error for that network parameter; (ii) calculating, for each network parameter, the product of the square of the quantisation error for that network parameter, and the absolute value of the sensitivity of the DNN with respect to that network parameter; and (iii) calculating the sum of the products. This is expressed in equation (20). Testing has shown that calculating the estimated error G in accordance with equation (20) works well for many DNNs. It will be evident to a person of skill in the art that these are examples only and the estimate of the error G may be calculated from the quantisation errors and sensitivities for the network parameters in any suitable manner.

$$G = \left|\sum_{i=1}^{N} ((q(x_i, F) - x_i) * s_i)\right| \tag{18}$$

$$G = \sum_{i=1}^{N} |(q(x_i, F) - x_i) * s_i| \tag{19}$$

$$G = \sum_{i=1}^{N} (q(x_i, F) - x_i)^2 * |s_i| \tag{20}$$

Where the bit width varies between candidate number formats the local error E may be modified to include an additional term that penalises number formats with large bit depths. For example, in some cases, as shown in equation (21) the local error E may be amended to include a size parameter B which reflects the size of the network parameters when using a particular candidate number format. For example, in some cases, B may be a positive value based on the number of bits to represent the network parameters when using a particular candidate number format. Since the quantisation error, and thus the estimated error G, can always be reduced by increasing the bit width, the bit width that produces the best, or minimum, G will typically be the number format with the largest bit width. However, larger bit widths increase the size of the DNN which increases the costs to implement the DNN. Accordingly, by adding the additional term to the local error E that penalises large bit depths a number format that balances size and accuracy will be selected.

$$E(F) = G(q(x, F) - q(x), s(x)) + B(F) \tag{21}$$

Method

Figure 8:
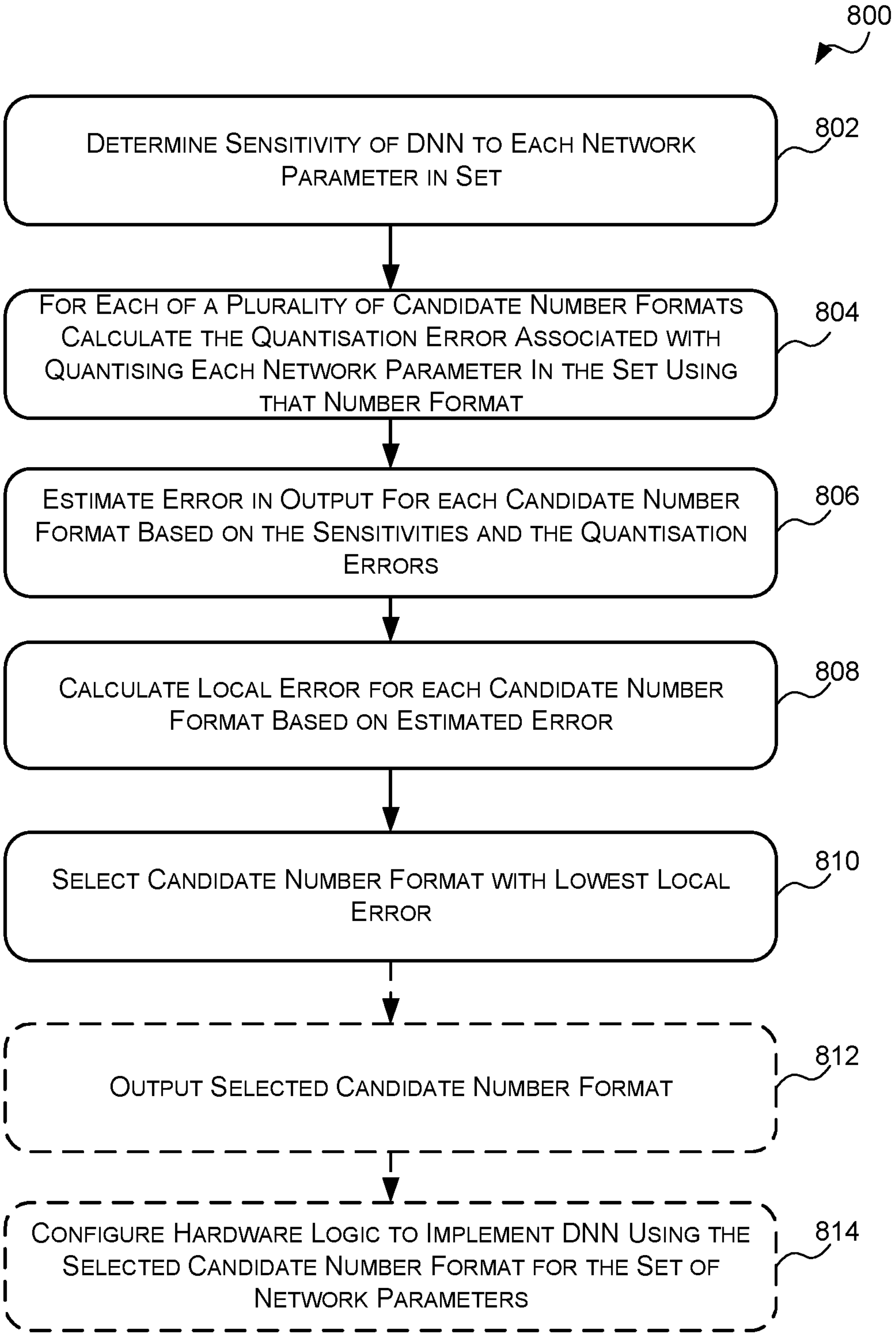
FIG. 8 is a flow diagram of an example method of selecting a number format for representing a set of network parameters of a DNN.

Reference is now made to FIG. 8 which illustrates an example method 800 for selecting a number format to represent a set of network parameters of a DNN. The method 800 may be implemented by a computing-based device such as the computing-based device 1500 described below with respect to FIG. 15. For example, there may be a computer readable storage medium having stored thereon computer readable instructions that, when executed at a computing-based device, cause the computing-based device to perform the method 800 of FIG. 8.

Figure 3:
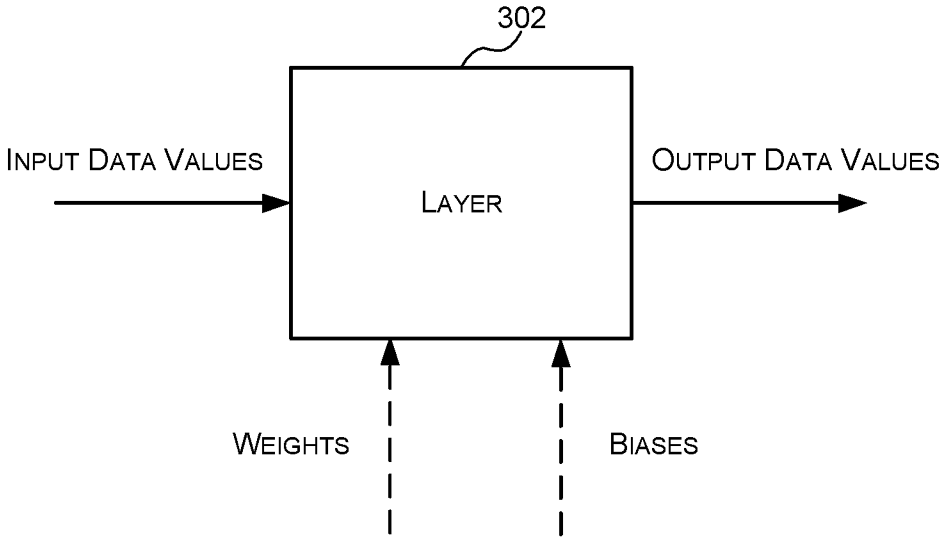
FIG. 3 is a schematic diagram illustrating the data input to, and output from, a layer of a DNN.

As described above with respect to FIG. 3, each layer of a DNN receives input data values and generates output data values. Some layers, such as convolutional layers and fully connected layers also receive weights and/or biases which are used in combination with the input data values of the layer to generate the output data values. The network parameters of a DNN include the input data values, the weights, the biases and the output data values for all of the layers. Accordingly, there are four types of network parameters—input data values, weights, biases, and output data values. A set of network parameters may, for example, include all or a portion of the network parameters of the same type for a layer. For example, a set of network parameters may include all or a portion of the input data values for a layer; all or a portion of the weights for a layer; all or a portion of the biases for a layer; or all or a portion of the output data values for a layer.

The method 800 begins at block 802 where the sensitivity of the DNN with respect to each of the network parameters in the set is determined. As described above, the sensitivity of the DNN with respect to a network parameter is a measure of the importance, significance, or relevance of a network parameter to the output of the DNN. In some cases, determining the sensitivity of the DNN with respect to each of the network parameters may comprise determining the output of a model of the DNN in response to input data; determining the partial derivative of one or more values based on the output of the DNN with respect to each of the network parameters in the set; and calculating the sensitivity for each network parameter based on the partial derivative(s) for that network parameter.

Figure 9:
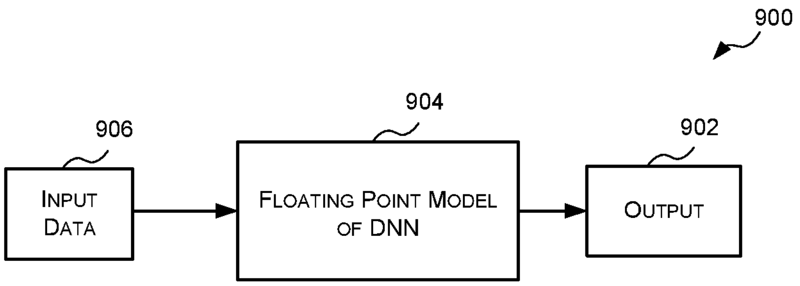
FIG. 9 is a schematic diagram illustrating determining the output of a model of a DNN in response to input data.

A model of a DNN is a representation of the DNN that can be used to determine the output of the DNN in response to input data. The model may be, for example, a software implementation of the DNN or a hardware implementation of the DNN. As shown in FIG. 9 at 900, determining the output 902 of a model of the DNN 904 in response to input data 906 comprises passing the input data through the layers of the DNN and obtaining the output thereof. This may be referred to as forward-propagation, or a forward pass, of the DNN because the calculation flow is going from the input through the DNN to the output.

In some cases, the model may be a floating point model of the DNN (i.e. a model of the DNN in which the network parameters of the DNN are represented using floating point number formats). Since values can generally be represented more accurately, or more precisely, in a floating point number format a floating point model of the DNN represents a model of the DNN that will produce the most accurate output. Accordingly, the output generated by a floating point model of the DNN may be used to determine the sensitivity of the DNN to each of the network parameters.

In some cases, the output of a DNN may comprise a single value $f$. In these cases the partial derivative of the output with respect to each of the network parameters in the set may be calculated and the partial derivative for a network parameter may be used as the sensitivity of the DNN with respect to that network parameter. For example, where a DNN produces a single output $f$ and there are three network parameters in the set $x_1$, $x_2$ and $x_3$ then $$\frac{\partial f}{\partial x_1}, \frac{\partial f}{\partial x_2} \text{ and } \frac{\partial f}{\partial x_3}$$

are calculated and $$\frac{\partial f}{\partial x_1}$$

is used as teh sensitivity of the DNN with respect to $x_1$ (i.e.

$$\left.s_1 = \frac{\partial f}{\partial x_1}\right), \frac{\partial f}{\partial x_2}$$

is used as teh sensitivity of the DNN with respect to $x_2$ (i.e.

$$\left.s_2 = \frac{\partial f}{\partial x_2}\right), \text{ and } \frac{\partial f}{\partial x_3}$$

is used as the sensitivyt of the DNN with respect to $x_3$ (i.e.

$$\left.s_3 = \frac{\partial f}{\partial x_3}\right).$$

In other cases, the output of the DNN (such as a classification DNN) may comprise multiple values $f_1, f_2, \ldots f_M$. In these cases, the partial derivative of each of the outputs with respect to each of the network parameters in the set may be calculated (e.g. a Jacobian matrix may be calculated) and the sensitivity for a network parameter may be a combination of the partial derivatives for the network parameter. For example, the sensitivity of the DNN with respect to a particular network parameter may be calculated as the sum of the partial derivatives as set out in equation (12). Alternatively a single value S, which may be referred to as the representative output value or the summary value, may be generated from the plurality of output values $f_1$, $f_2$, $f_M$ and the partial derivative of the representative output value S with respect to each of the network parameters $$\left(\frac{\partial S}{\partial x_1} \cdots \frac{\partial S}{\partial x_N}\right)$$

may be calculated.

The partial derivative for a network parameter may be used as the sensitivity of the DNN with respect to the network parameter. The representative output value, or the summary value, S may be calculated from the plurality of output values in any suitable manner. For example, the representative output value S may be equal to the sum of the outputs as set out in equation (14) or the representative output value S may be the maximum of the outputs as set out in equation (15).

In some cases, the partial derivatives may be calculated using back-propagation. As is known to those of skill in the art, back-propagation (which may also be referred to as backward propagation of errors) is a technique that may be used as part of an optimisation algorithm to train a DNN. Training a DNN comprises identifying the appropriate weights to configure the DNN to perform a specific function.

Back-propagation works by computing the partial derivative of an error function with respect to a network parameter by the chain rule, computing the gradient one layer at a time, iterating backwards from the last layer.

Figure 10:
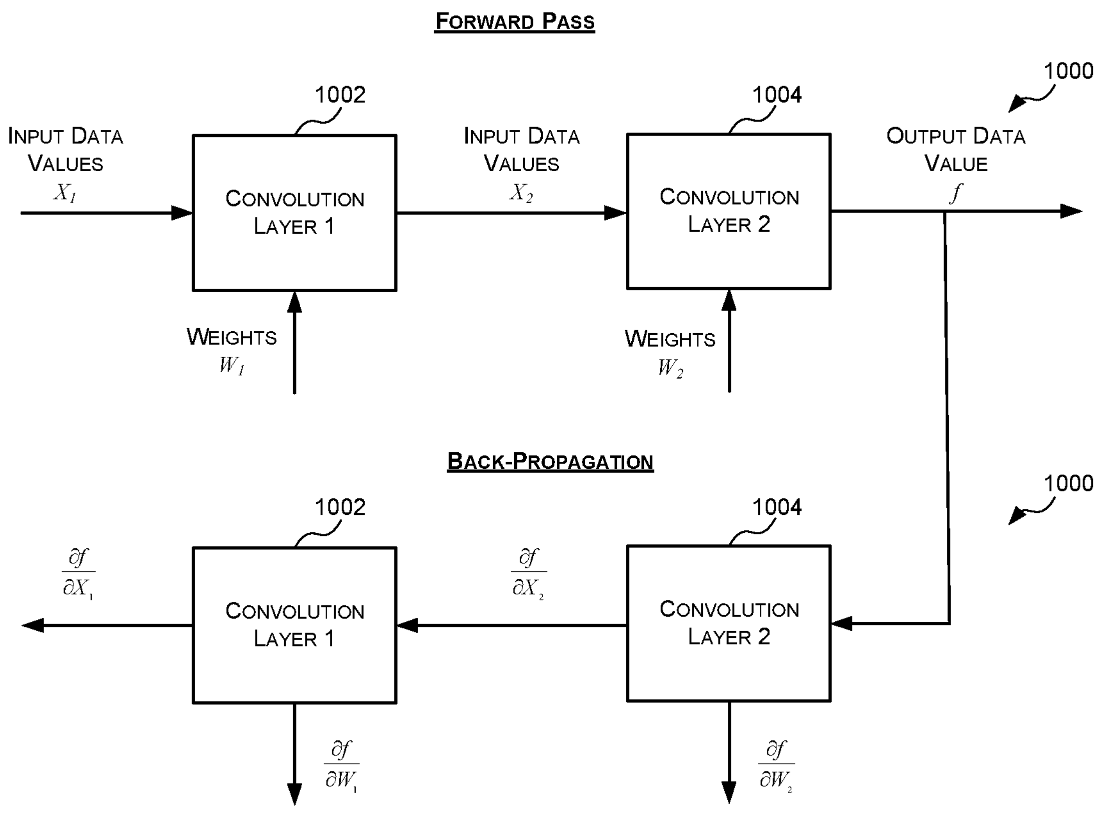
FIG. 10 is a schematic diagram illustrating back-propagation for an example DNN with a single output.
Figure 11:
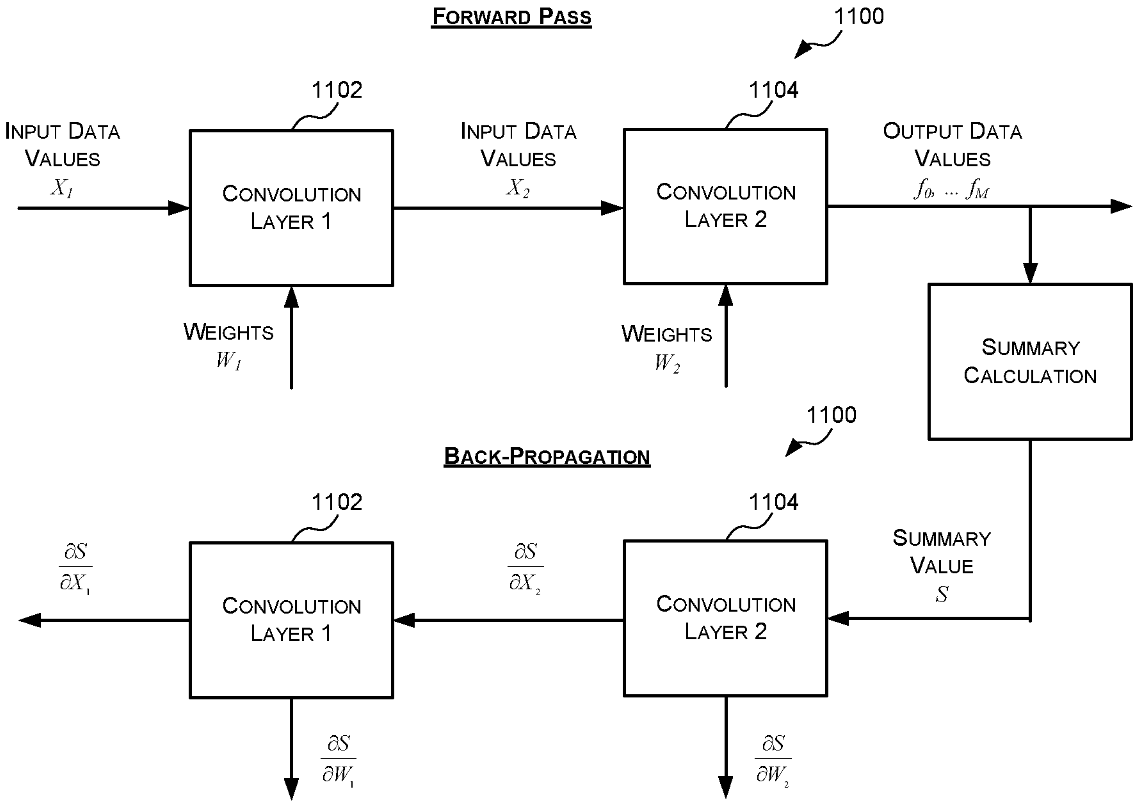
FIG. 11 is a schematic diagram illustrating back-propagation for an example DNN with a plurality of outputs.

The partial derivative of an output, or a representative/summary value for an output or set of outputs, with respect to any network parameter can be generated via back-propagation. For example, FIG. 10 illustrates a first example DNN 1000 comprising a first convolution layer 1002 and a second convolution layer 1004 which generates a single output value $f$, and back-propagation of the derivative of that single output value $f$ to the network parameters $X_1$, $W_1$, $X_2$ and $W_2$. FIG. 11 illustrates a second example DNN 1100 comprising a first convolution layer 1102 and a second convolution layer 1104 which generates a plurality of output values $f_1, f_2, \ldots F_M$, and back-propagation of the derivative of the summary value S to the network parameters $X_1$, $W_1$, $X_2$ and $W_2$. The partial derivatives may be generated via back-propagation, for example, by any suitable tool for training a DNN using back-propagation such as, but not limited to, TensorFlow™.

Figure 12:
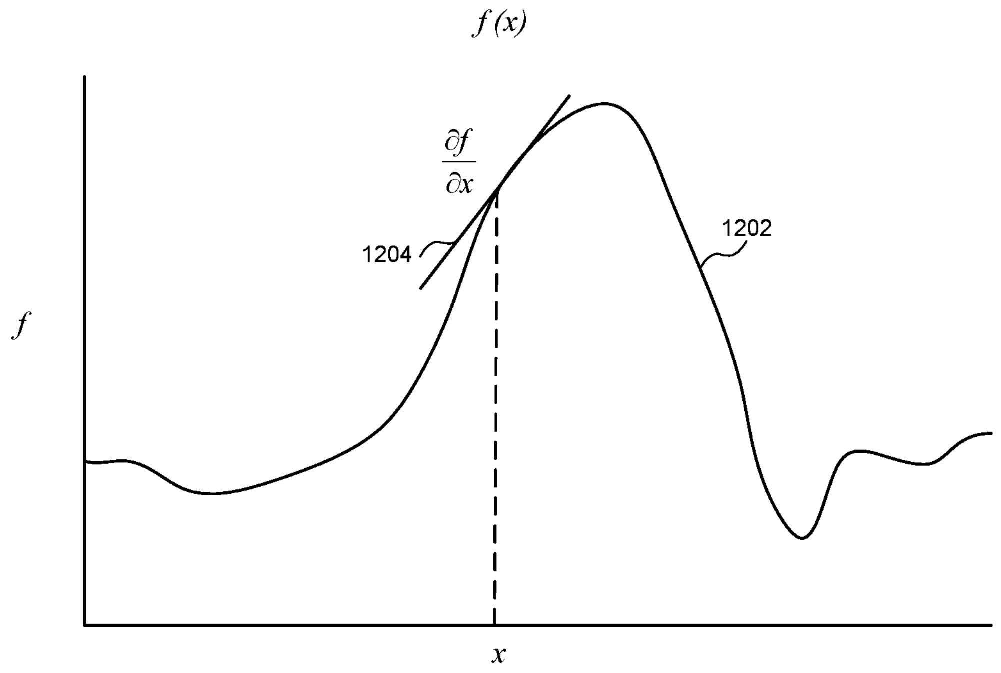
FIG. 12 is a schematic diagram illustrating the partial derivative of the output of a DNN with respect to a network parameter.

The magnitude of the gradient of an output $f$, or a representative/summary S of an output or a set of outputs, with respect to a particular network parameter $$\left(\frac{\partial f}{\partial x} \text{ or } \frac{\partial S}{\partial x}\right)$$

indicates whether quantisation of the network parameter will have a significant impact on the output of the DNN. Specifically, the higher the magnitude of the gradient, the greater the effect the quantisation of the network parameter has on the output(s); and the lower the magnitude of the gradient, the less effect the quantisation of the network parameter has on the output(s). As shown in FIG. 12, the partial derivative of an output with respect to a particular output, or a representative for an output or a set of outputs, gives an approximation of the function $f$ 1202 using its tangent 1204. As the partial derivative is just an approximation, the greater the quantisation error, the more approximate this becomes.

Once the sensitivity of the DNN with respect to each network parameter in the set has been determined the method 800 proceeds to block 804.

At block 804, for each candidate number format of a plurality of candidate number formats, the quantisation error associated with quantising each network parameter in the set in accordance with that candidate number format is determined. In some cases, the plurality of candidate number formats may comprise all possible candidate number formats of a particular type of number format. For example, if a number format type is defined by an exponent exp and a bit width b and the exponent exp can be 0 or 1 and the bit width b can be 2, 3 or 4 then the candidate number formats may comprise all possible combinations of exponents exp and bits widths b—e.g. a number format defined by exponent of 0 and a bit width of 2, a number format defined by an exponent of 0 and a bit width of 3, a number format defined by an exponent of 0 and a bit width of 4, a number format defined by an exponent of 1 and a bit width of 2, a number format defined by an exponent of 1 and a bit width of 3, and a number format defined by an exponent of 1 and a bit width of 4.

In other cases, the candidate number formats may comprise only a subset of the possible number formats of a particular number format type. For example, in some cases, all of the candidate number formats may have the same value for one quantisation parameter and different values for another quantisation parameter. In this way the method 800 may be used to select the value for one of the quantisation parameters. The value(s) for the other quantisation parameter(s) may be selected in any suitable manner. For example, where the number formats are defined by an exponent exp and a bit width b the candidate number formats may all have the same bit width b but different exponents exp; or the candidate number formats may all have the same exponent exp but different bit widths b. In some cases, the candidate number formats may be selected from the possible number formats using one or more criteria. For example, if one of the quantisation parameters is an exponent exp, the maximum/minimum method may be used to provide an upper bound on the exponent exp and the candidate number formats may only comprise number formats with exponents exp less than or equal to the upper bound. For example, if an exponent may be any integer from 1 to 5, and the upper bound as determined from, for example, the minimum/maximum method is 3, then the plurality of candidate number formats may comprise number formats with exponents of 1, 2 and 3 only.

For each of the possible candidate number formats a quantisation error is determined for each network parameter in the set. For example, if there are four candidate number formats each defined by a bit width b and an exponent exp—$F_0$ (b=8, exp=0), $F_1$(b=8, exp=1), $F_2$(b=8, exp=2) and $F_3$ (b=8, exp=4)—each network parameter may be quantised four times, once in accordance with the first number format $F_0$ defined by a bit width of 8 and an exponent of 0, once in accordance with the second number format $F_1$ defined by a bit width of 8 and an exponent of 1, once in accordance with the third number format $F_2$ defined by a bit width of 8 and an exponent of 2, and once in accordance with the fourth number format $F_3$ defined by a bit width of 8 and an exponent of 3. The quantisation error $e_{i,k}$ associated with quantising each network parameter $x_i$ in accordance with each candidate number format $F_k$ is then determined. Accordingly, each candidate number format is associated with three quantisation errors, one for each network parameter as shown in Table 2.

TABLE 2

| Candidate Number Format | Network Parameter 0 $x_0$ | Network Parameter 1 $x_1$ | Network Parameter 2 $x_2$ |
|---|---|---|---|
| $F_0$ | $q(x_0, F_0)e_{0,0}$ | $q(x_1, F_0)e_{1,0}$ | $q(x_2, F_0)e_{2,0}$ |
| $F_1$ | $q(x_0, F_1)e_{0,1}$ | $q(x_1, F_1)e_{1,1}$ | $q(x_2, F_1)e_{2,1}$ |
| $F_2$ | $q(x_0, F_2)e_{0,2}$ | $q(x_1, F_2)e_{1,2}$ | $q(x_2, F_2)e_{2,2}$ |
| $F_3$ | $q(x_0, F_3)e_{0,3}$ | $q(x_1, F_3)e_{1,3}$ | $q(x_2, F_3)e_{2,3}$ |

As is known to those of skill in the art, quantisation is the process of converting a number in a higher precision number format to a lower precision number format. Quantising a number in a higher precision format to a lower precision format generally comprises selecting one of the representable numbers in the lower precision format to represent the number in the higher precision format based on a particular rounding mode (such as, but not limited to round to nearest (RTN), round to zero (RTZ), ties to even (RTE), round to positive infinity (RTP), and round to negative infinity (RTNI)).

For example, equation (22) sets out an example formula for quantising a value h in a first number format into a value q(h, F) in a second, lower precision, number format F where $X_{max}$ is the highest representable number in the second number format, $X_{min}$ is the lowest representable number in the second number format, and RND(h) is a rounding function:

$$q(h, F) = \begin{cases} X_{max}, & \text{if } h \geq X_{max} \\ X_{min}, & \text{if } h \leq X_{min} \\ 0, & \text{if } h = 0 \\ RND(h), & \text{otherwise} \end{cases} \quad (22)$$

The formula set out in equation (22) quantises a value h in a first number format to one of the representable numbers in the second number format F, wherein the representable number in the second number format F is selected based on the rounding mode RND (e.g. RTN, RTZ, RTE, RTP or RTNI).

In the examples described herein, the lower precision format is a block-configurable type of number format and the higher precision format may be any number format (although it is often a floating point number format). In other words, each network parameter is initially in a first number format (e.g. a floating point number format), and is quantised to a lower precision block-configurable type number format.

In some cases, the quantisation error $e_{i,k}$ for a network parameter $x_i$ for a specific candidate number format $F_k$ may be calculated as the difference between the initial network parameter $x_i$ in an initial format (e.g. in a floating point number format) and the initial network parameter quantised in accordance with the candidate number format $q(x_i, F_k)$ as shown in equation (23).

$$e_{i,k} = q(x_i, F_k) - x_i \quad (23)$$

Once a quantisation error $e_{i,k}$ has been determined for each network parameter, for each candidate number format the method 800 proceeds to block 806.

At block 806, for each candidate number format, an estimate of the error G in the output of the DNN caused by quantisation of the set of network parameters is generated based on the sensitivities $s_i$ calculated in block 802 and the quantisation errors $e_{i,k}$ associated with that candidate number format calculated in block 804. Table 3 illustrates, for the example described above with respect to Table 2 where there are three network parameters in the set $x_0$, $x_1$, $x_2$ and there are four candidate number formats $F_0$, $F_1$, $F_2$, $F_3$, the relevant quantisation errors $e_{i,k}$ and sensitivities $s_i$ for generating the error estimate G for each candidate number format.

TABLE 3

| Candidate Number Format | Error Estimate | Relevant Quantisation Errors | Relevant Sensitivities |
|---|---|---|---|
| $F_0$ | $G_0$ | $e_{0,0}$, $e_{1,0}$, $e_{2,0}$ | $s_0$, $s_1$, $s_2$ |
| $F_1$ | $G_1$ | $e_{0,1}$, $e_{1,1}$, $e_{2,1}$ | $s_0$, $s_1$, $s_2$ |
| $F_2$ | $G_2$ | $e_{0,2}$, $e_{1,2}$, $e_{2,2}$ | $s_0$, $s_1$, $s_2$ |
| $F_3$ | $G_3$ | $e_{0,3}$, $e_{1,3}$, $e_{2,3}$ | $s_0$, $s_1$, $s_2$ |

The estimate of the error G for a candidate number format may be generated in any suitable manner from the relevant quantisation errors and the sensitivities. In one example the estimate of the error G for a candidate number format may be calculated as the weighted sum of the relevant quantisation errors where the weight of a quantisation error for a network parameter is the sensitivity of the DNN for that network parameter. This is expressed in equation (13). In another example, the estimate of the error G may be calculated as the absolute value of the weighted sum of the quantisation errors, wherein the weight for a quantisation error for a network parameter is equal to the sensitivity of the DNN for that network parameter This is expressed by equation (18). In another example, the estimate of the error G may be calculated by (i) calculating, for each network parameter in the set, the absolute value of the product of the quantisation error for that network parameter and the sensitivity of the DNN with respect to that network parameter; and (ii) calculating the sum of the absolute values. This is expressed in equation (19). In yet another example, the estimate of the error G may be calculated by (i) calculating, for each network parameter, the square of the quantisation error for that network parameter; (ii) calculating, for each network parameter, the product of the square of the quantisation error for that network parameter, and the absolute value of the sensitivity of the DNN with respect to that network parameter; and (iii) calculating the sum of the products. This is expressed in equation (20). As described above, testing has shown that calculating the estimated error G in accordance with equation (20) works well for many DNNs. It will be evident to a person of skill in the art that these are examples only and the estimate of the error G may be calculated from the quantisation errors and sensitivities in any suitable manner.

Once an estimate of the error G has been generated for each candidate number format the method 800 proceeds to block 808.

At block 808, for each candidate number format, a local error E is generated based on the corresponding error estimate G. In some cases (e.g. when the candidate number formats have the same bit depth) the local error may be equal to the error estimate G. In other cases, the local error E may be a combination of the estimated error G and one or more other parameters or terms. For example, as shown in equation (21), when the candidate number formats have different bit widths, the local error E may be amended to include a size parameter or term B which reflects the size of the network parameters when using a particular candidate number format. For example, in some cases, B may be a positive value based on the number of bits to represent the network parameters using the candidate number format. Since the quantisation error, and thus the estimated error G, can always be reduced by increasing the bit width, without the size term the number format that produces the best, or minimum, G will likely be the number format with the largest bit width. Accordingly, by adding the additional term to the local error E that penalises large bit depths a number format that balances size and accuracy will be selected.

Once the local error E has been generated for each candidate number format the method 800 proceeds to block 810.

At block 810, the candidate number format that has the lowest local error E is selected as the number format for the set of network parameters. For example, in the example described above with respect to Tables 2 and 3 where there are three network parameters $x_0$, $x_1$, $x_2$ and four candidate number formats $F_0$, $F_1$, $F_2$, $F_3$ and the first candidate number format $F_0$ has the smallest local error E then the first candidate number format $F_0$ may be selected as the number format for the set of network parameters. After one of the candidate number formats has been selected based on the local errors E associated therewith the method 800 may end or the method 800 may proceed to block 812 and/or block 814.

At block 812, the selected number format is output for use in configuring hardware logic (e.g. DNN accelerator) to implement the DNN. The selected number format may be output in any suitable manner. Once the selected number format has been output the method 800 may end or the method 800 may proceed to block 814.

At block 814, hardware logic capable of implementing a DNN is configured to implement the DNN using the number format selected in block 810. Configuring hardware logic to implement a DNN may generally comprise configuring the hardware logic to process inputs to each layer of the DNN in accordance with that layer and provide the output of that layer to a subsequent layer or provide the output as the output of the DNN. For example, if a DNN comprises a first convolution layer and a second normalisation layer, configuring hardware logic to implement such a DNN comprises configuring the hardware logic to receive inputs to the DNN and process the inputs in accordance with the weights of the convolution layer, process the outputs of the convolution layer in accordance with the normalisation layer, and then output the outputs of the normalisation layer as the outputs of the DNN. Configuring hardware logic to implement a DNN using the number format selected in block 810 may comprise configuring the hardware logic to receive and process the set of network parameters in accordance with the selected number format. For example, if the selected number format for a set of network parameters is defined by a bit-width of 6 and an exponent of 4 then the hardware logic to implement the DNN may be configured to interpret and process the network parameters in the set on the basis that they are in a number format defined by a bit width of 6 and an exponent of 4.

Figure 13:
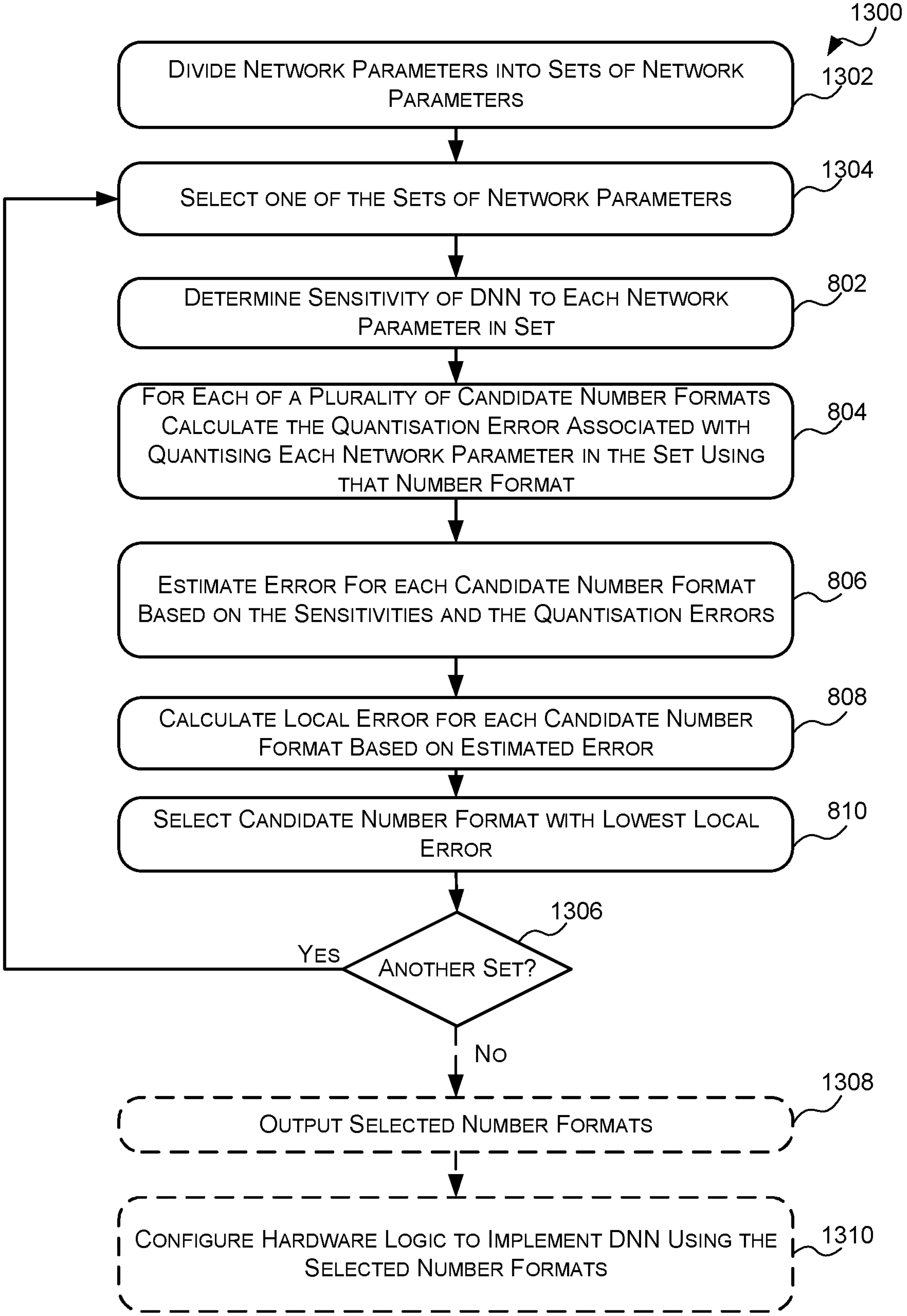
FIG. 13 is a flow diagram of an example method of determining number formats for representing the network parameters of a DNN.

In some cases, the method 800 of FIG. 8 may be used to determine a number format for each set of network parameters by repeating method 800 for each set of network parameters. Reference is now made to FIG. 13 which illustrates an example method 1300 for determining number formats for representing the network parameters of a DNN. The method 1300 begins at block 1302 where the network parameters are divided into groups or sets of network parameters. The network parameters may be divided into groups or sets in any suitable manner. Preferably the network parameters are grouped such that similar network parameters are grouped together. In some cases, since network parameters of the same layer tend to be related, each set may comprise all or a portion of the network parameters of the same type for a layer of the DNN. For example, each set of network parameters may comprise: all or a portion of the input data values for a layer; all or a portion of the weights for a layer; all or a portion of the biases for a layer; or all or portion of the output data values for a layer. Once the network parameters have been divided into groups or sets the method 1300 proceeds to block 1304.

At block 1304 one of the sets of network parameters is selected. Then blocks 802 to 810 of the method 800 of FIG. 8 are executed to identify the number format for representing that set of network parameters. Once a number format has been selected the method 1300 proceeds to block 1306 where it is determined whether there are any more sets of network parameters for which the number format has not been determined. If there is at least one more set of network parameters for which the number format has not been determined, then the method 1300 proceeds back to block 1304 where a set of network parameters is selected and blocks 802 to 810 of the method 800 of FIG. 8 are executed to identify a number format for that set of network parameters. If, however, there are no more sets of network parameters for which a number format has not been determined then the method 1300 may end or the method may proceed to block 1308 where the selected number formats are output and/or to block 1310 where hardware logic is configured to implement the DNN using the selected number formats.

Although in the method 1300 of FIG. 13 the number formats for the sets of network parameters are selected sequentially (i.e. one at a time), in other examples the number formats for two or more layers may be selected in parallel (e.g. the selection of a number format for the input data values for a first layer may be performed in parallel with the selection of a number format for the input data values for a second layer).

Test Results

Table 4 shows the Top-1 and Top-5 classification accuracy of different classification neural networks trained on the ImageNet validation set for 50,000 labelled images when number formats defined by an exponent and bit width are used for each network parameter type for each layer and the exponent is selected in accordance with the minimum/maximum method, the weighted outlier method, the end-to-end method and the method 1300 of FIG. 13. In these examples the bit width for data and weights was 8 (two's complement format), the bit width for biases was 16 (two's complement format) and 50 labelled images were used for format selection. As is known to those of skill in the art, the Top-N classification accuracy is a measure of how often the correct classification is in the top N classifications output by the DNN.

TABLE 4

| | Minimum/ Maximum | | Weighted Outlier | | End to End | | Method of FIG. 13 | | Original | |
|---|---|---|---|---|---|---|---|---|---|---|
| DNN | Top-1 | Top-5 | Top-1 | Top-5 | Top-1 | Top-5 | Top-1 | Top-5 | Top-1 | Top-5 |
| 1 | 0.4695 | 0.6961 | 0.7816 | 0.9426 | 0.7954 | 0.9492 | 0.7993 | 0.9504 | 0.8041 | 0.9525 |
| 2 | 0.6748 | 0.8832 | 0.6843 | 0.8883 | 0.6686 | 0.8735 | 0.6845 | 0.8864 | 0.6971 | 0.8950 |
| 3 | 0.7237 | 0.9096 | 0.7316 | 0.9145 | 0.7303 | 0.9102 | 0.7352 | 0.9128 | 0.7384 | 0.9176 |
| 4 | 0.7653 | 0.9323 | 0.7651 | 0.9309 | 0.7701 | 0.9272 | 0.7737 | 0.9273 | 0.7794 | 0.9379 |
| 5 | 0.7914 | 0.9449 | 0.7942 | 0.9483 | 0.7941 | 0.9468 | 0.7978 | 0.9495 | 0.8020 | 0.9517 |
| 6 | 0.0407 | 0.0305 | 0.0115 | 0.0590 | 0.4291 | 0.6691 | 0.5989 | 0.8213 | 0.7096 | 0.8981 |
| 7 | 0.0033 | 0.0109 | 0.0034 | 0.0111 | 0.5311 | 0.7693 | 0.6605 | 0.8664 | 0.7176 | 0.9055 |
| 8 | 0.6888 | 0.8847 | 0.7267 | 0.9089 | 0.7400 | 0.9091 | 0.7558 | 0.9154 | 0.7653 | 0.9290 |
| 9 | 0.6998 | 0.8905 | 0.7121 | 0.8995 | 0.7095 | 0.8774 | 0.7136 | 0.8756 | 0.7192 | 0.9059 |
| 10 | 0.6803 | 0.8814 | 0.6917 | 0.8876 | 0.6869 | 0.8651 | 0.6934 | 0.8721 | 0.6970 | 0.8941 |

DNNs

1—inception_resnet_v2
2—inception_v1
3—inception_v2
4—inception_v3
5—inception_v4
6—mobilenet_v1_1.0_224
7—mobilenet_v2_1.0_224
8—resnet_v1_101
9—resnet_v2_101
10—resnet_v2_50

It can be seen from Table 4 that the method 1300 of FIG. 13 was able to select number formats that produced accuracies that were the same or higher than the number formats selected by other number format selection methods. In fact, it can be seen that the method 800 of FIG. 8 was able to select number formats that resulted in good accuracy for neural networks, such as MobileNet, that other format selection methods found difficult (i.e. were unable to select number formats that achieved good accuracy). Accordingly, despite being relatively simple to implement, the method 1300 of FIG. 13 produces consistently high accuracy across the neural networks compared to other number format selection methods, including the difficult and costly to implement end-to-end method.

Example DNN Accelerator

Figure 14:
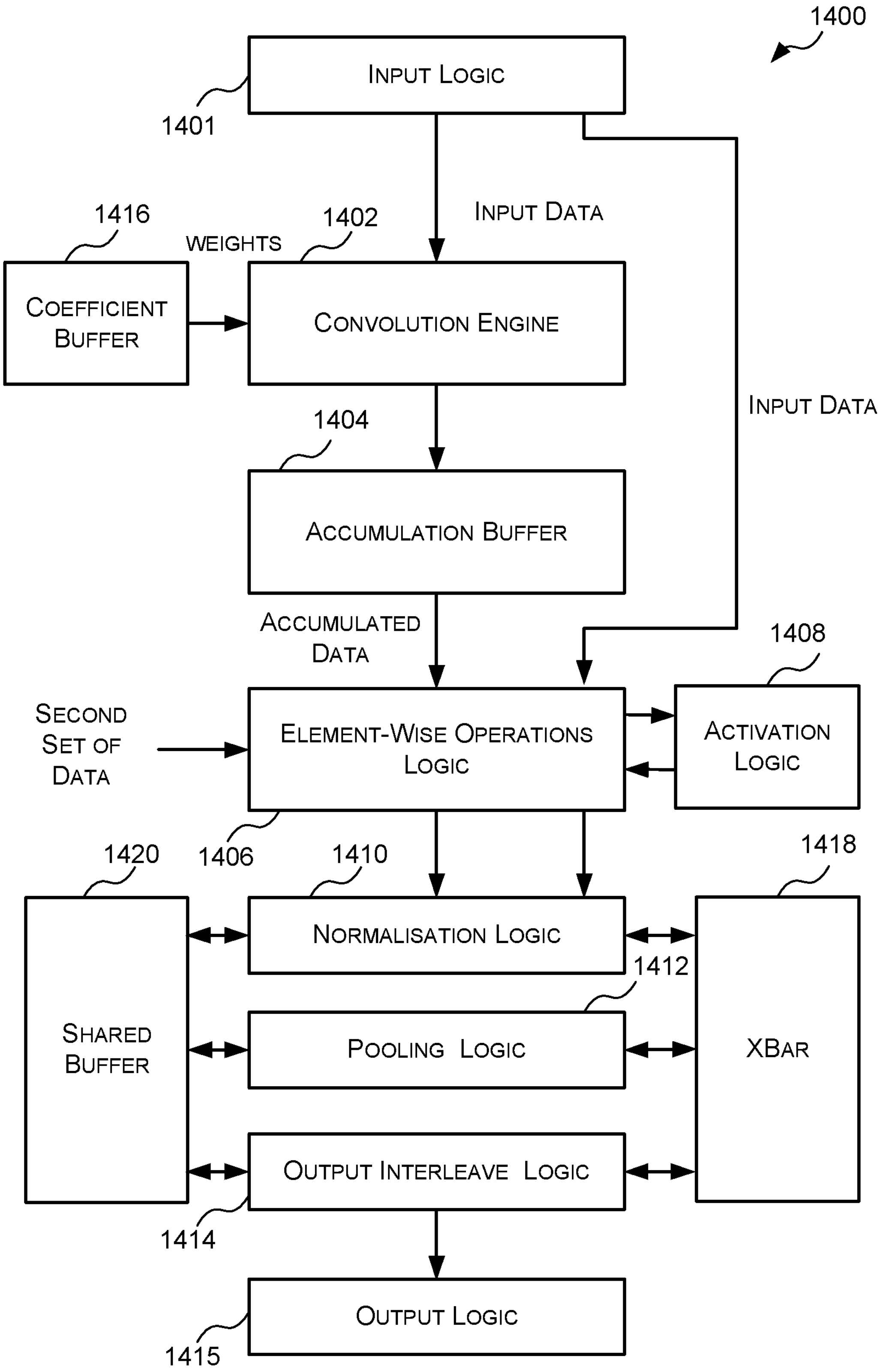
FIG. 14 is a block diagram of an example DNN accelerator.

Reference is now made to FIG. 14 which illustrates example hardware logic which can be configured to implement a DNN using the number format(s) identified in accordance with the method 800 of FIG. 8 or the method 1300 of FIG. 13. Specifically FIG. 14 illustrates an example DNN accelerator 1400.

The DNN accelerator 1400 of FIG. 14 is configured to compute the output of a DNN through a series of hardware passes (which also may be referred to as processing passes) wherein during each pass the DNN accelerator receives at least a portion of the input data for a layer of the DNN and processes the received input data in accordance with that layer (and optionally in accordance with one or more following layers) to produce processed data. The processed data is either output to memory for use as input data for a subsequent hardware pass or output as the output of the DNN. The number of layers that the DNN accelerator can process during a single hardware pass may be based on the size of the data, the configuration of the DNN accelerator and the order of the layers. For example, where the DNN accelerator comprises hardware logic to perform each of the possible layer types a DNN that comprises a first convolution layer, a first activation layer, a second convolution layer, a second activation layer, and a pooling layer may be able to receive the initial DNN input data and process that input data according to the first convolution layer and the first activation layer in the first hardware pass and then output the output of the activation layer into memory, then in a second hardware pass receive that data from memory as the input and process that data according to the second convolution layer, the second activation layer, and the pooling layer to produce the output data for the DNN.

The example DNN accelerator 1400 of FIG. 14 comprises input logic 1401, a convolution engine 1402, an accumulation buffer 1404, an element-wise operations logic 1406, activation logic 1408, normalisation logic 1410, pooling logic 1412, output interleave logic 1414 and output logic 1415. Each logic component or engine implements or processes all or a portion of one or more types of layers. Specifically, together the convolution engine 1402 and the accumulation buffer 1404 implement or process a convolution layer or a fully connected layer. The activation logic 1408 processes or implements an activation layer. The normalisation logic 1410 processes or implements a normalisation layer. The pooling logic 1412 implements a pooling layer and the output interleave logic 1414 processes or implements an interleave layer.

The input logic 1401 is configured to receive the input data to be processed and provides it to a downstream logic component for processing.

The convolution engine 1402 is configured to perform a convolution operation on the received input data using the weights associated with a particular convolution layer. The weights for each convolution layer of the DNN may be stored in a coefficient buffer 1416 as shown in FIG. 14 and the weights for a particular convolution layer may be provided to the convolution engine 1402 when that particular convolution layer is being processed by the convolution engine 1402. Where the DNN accelerator supports variable weight formats then the convolution engine 1402 may be configured to receive information indicating the format or formats of the weights of the current convolution layer being processed to allow the convolution engine to properly interpret and process the received weights.

The convolution engine 1402 may comprise a plurality of multipliers (e.g. 128) and a plurality of adders which add the result of the multipliers to produce a single sum. Although a single convolution engine 1402 is shown in FIG. 14, in other examples there may be multiple (e.g. 8) convolution engines so that multiple windows can be processed simultaneously. The output of the convolution engine 1402 is fed to the accumulation buffer 1404.

The accumulation buffer 1404 is configured to receive the output of the convolution engine and add it to the current contents of the accumulation buffer 1404. In this manner, the accumulation buffer 1404 accumulates the results of the convolution engine 1402 over several hardware passes of the convolution engine 1402. Although a single accumulation buffer 1404 is shown in FIG. 14, in other examples there may be multiple (e.g. 8, one per convolution engine) accumulation buffers. The accumulation buffer 1404 outputs the accumulated result to the element-wise operations logic 1406 which may or may not operate on the accumulated result depending on whether an element-wise layer is to be processed during the current hardware pass.

The element-wise operations logic 1406 is configured to receive either the input data for the current hardware pass (e.g. when a convolution layer is not processed in the current hardware pass) or the accumulated result from the accumulation buffer 1404 (e.g. when a convolution layer is processed in the current hardware pass). The element-wise operations logic 1406 may either process the received input data or pass the received input data to other logic (e.g. the activation logic 1408 and/or or the normalisation logic 1410) depending on whether an element-wise layer is processed in the current hardware pass and/or depending on whether an activation layer is to be processed prior to an element-wise layer. When the element-wise operations logic 1406 is configured to process the received input data the element-wise operations logic 1406 performs an element-wise operation on the received data (optionally with another data set (which may be obtained from external memory)). The element-wise operations logic 1406 may be configured to perform any suitable element-wise operation such as, but not limited to add, multiply, maximum, and minimum. The result of the element-wise operation is then provided to either the activation logic 1408 or the normalisation logic 1410 depending on whether an activation layer is to be processed subsequent the element-wise layer or not.

The activation logic 1408 is configured to receive one of the following as input data: the original input to the hardware pass (via the element-wise operations logic 1406) (e.g. when a convolution layer is not processed in the current hardware pass); the accumulated data (via the element-wise operations logic 1406) (e.g. when a convolution layer is processed in the current hardware pass and either an element-wise layer is not processed in the current hardware pass or an element-wise layer is processed in the current hardware pass but follows an activation layer). The activation logic 1408 is configured to apply an activation function to the input data and provide the output data back to the element-wise operations logic 1406 where it is forwarded to the normalisation logic 1410 directly or after the element-wise operations logic 1406 processes it. In some cases, the activation function that is applied to the data received by the activation logic 1408 may vary per activation layer. In these cases, information specifying one or more properties of an activation function to be applied for each activation layer may be stored (e.g. in memory) and the relevant information for the activation layer processed in a particular hardware pass may be provided to the activation logic 1408 during that hardware pass.

In some cases, the activation logic 1408 may be configured to store, in entries of a lookup table, data representing the activation function. In these cases, the input data may be used to lookup one or more entries in the lookup table and output values representing the output of the activation function. For example, the activation logic 1408 may be configured to calculate the output value by interpolating between two or more entries read from the lookup table.

In some examples, the activation logic 1408 may be configured to operate as a Rectified Linear Unit (ReLU) by implementing a ReLU function. In a ReLU function, the output element $y_{i,j,k}$ is calculated by identifying a maximum value as set out in equation (24) wherein for x values less than 0, y=0:

$$y_{i,j,k} = f(x_{i,j,k}) = \max\{0, x_{i,j,k}\} \tag{24}$$

In other examples, the activation logic 1408 may be configured to operate as a Parametric Rectified Linear Unit (PReLU) by implementing a PReLU function. The PReLU function performs a similar operation to the ReLU function. Specifically, where $w_1, w_2, b_1, b_2 \in \mathbb{R}$ are constants, the PReLU is configured to generate an output element $y_{i,j,k}$ as set out in equation (25):

$$y_{i,j,k} = f(x_{i,j,k}; w_1, w_2, b_1, b_2) = \max\{(w_1 * x_{i,j,k} + b_1), (w_2 * x_{i,j,k} + b_2)\} \tag{25}$$

The normalisation logic 1410 is configured to receive one of the following as input data: the original input data for the hardware pass (via the element-wise operations logic 1406) (e.g. when a convolution layer is not processed in the current hardware pass and neither an element-wise layer nor an activation layer is processed in the current hardware pass); the accumulation output (via the element-wise operations logic 1406) (e.g. when a convolution layer is processed in the current hardware pass and neither an element-wise layer nor an activation layer is processed in the current hardware pass); and the output data of the element-wise operations logic and/or the activation logic. The normalisation logic 1410 then performs a normalisation function on the received input data to produce normalised data. In some cases, the normalisation logic 1410 may be configured to perform a Local Response Normalisation (LRN) Function and/or a Local Contrast Normalisation (LCN) Function. However, it will be evident to a person of skill in the art that these are examples only and that the normalisation logic 1410 may be configured to implement any suitable normalisation function or functions. Different normalisation layers may be configured to apply different normalisation functions.

The pooling logic 1412 may receive the normalised data from the normalisation logic 1410 or may receive the input data to the normalisation logic 1410 via the normalisation logic 1410. In some cases, data may be transferred between the normalisation logic 1410 and the pooling logic 1412 via an XBar 1418. The term "XBar" is used herein to refer to a simple hardware logic that contains routing logic which connects multiple logic components together in a dynamic fashion. In this example, the XBar may dynamically connect the normalisation logic 1410, the pooling logic 1412 and/or the output interleave logic 1414 depending on which layers will be processed in the current hardware pass. Accordingly, the XBar may receive information each pass indicating which logic components 1410, 1412, 1414 are to be connected.

The pooling logic 1412 is configured to perform a pooling function, such as, but not limited to, a max or mean function, on the received data to produce pooled data. The purpose of a pooling layer is to reduce the spatial size of the representation to reduce the number of parameters and computation in the network, and hence to also control overfitting. In some examples, the pooling operation is performed over a sliding window that is defined per pooling layer.

The output interleave logic 1414 may receive the normalised data from the normalisation logic 1410, the input data to the normalisation function (via the normalisation logic 1410), or the pooled data from the pooling logic 1412. In some cases, the data may be transferred between the normalisation logic 1410, the pooling logic 1412 and the output interleave logic 1414 via an XBar 1418. The output interleave logic 1414 is configured to perform a rearrangement operation to produce data that is in a predetermined order. This may comprise sorting and/or transposing the received data. The data generated by the last of the layers is provided to the output logic 1415 where it is converted to the desired output format for the current hardware pass.

The normalisation logic 1410, the pooling logic 1412, and the output interleave logic 1414 may each have access to a shared buffer 1420 which can be used by these logic components 1410, 1412 and 1414 to write data to and retrieve data from. For example, the shared buffer 1420 may be used by these logic components 1410, 1412, 1414 to rearrange the order of the received data or the generated data. For example, one or more of these logic components 1410, 1412, 1414 may be configured to write data to the shared buffer 1420 and read the same data out in a different order. In some cases, although each of the normalisation logic 1410, the pooling logic 1412 and the output interleave logic 1414 have access to the shared buffer 1420, each of the normalisation logic 1410, the pooling logic 1412 and the output interleave logic 1414 may be allotted a portion of the shared buffer 1420 which only they can access. In these cases, each of the normalisation logic 1410, the pooling logic 1412 and the output interleave logic 1414 may only be able to read data out of the shared buffer 1420 that they have written into the shared buffer 1420.

The logic components of the DNN accelerator 1400 that are used or active during any hardware pass are based on the layers that are processed during that hardware pass. In particular, only the logic components related to the layers processed during the current hardware pass are used or active. As described above, the layers that are processed during a particular hardware pass is determined (typically in advance, by, for example, a software tool) based on the order of the layers in the DNN and optionally one or more other factors (such as the size of the data). For example, in some cases the DNN accelerator may be configured to perform the processing of a single layer per hardware pass unless multiple layers can be processed without writing data to memory between layers. For example, if a first convolution layer is immediately followed by a second convolution layer each of the convolution layers would have to be performed in a separate hardware pass as the output data from the first hardware convolution needs to be written out to memory before it can be used as an input to the second. In each of these hardware passes only the logic components, or engines relevant to a convolution layer, such as the convolution engine 1402 and the accumulation buffer 1404, may be used or active.

Although the DNN accelerator 1400 of FIG. 14 illustrates a particular order in which the logic components, engines etc. are arranged and thus how the processing of data flows through the DNN accelerator, it will be appreciated that this is an example only and that in other examples the logic components, engines may be arranged in a different manner. Furthermore, other hardware logic (e.g. other DNN accelerators) may implement additional or alternative types of DNN layers and thus may comprise different logic components, engines etc.

Figure 15:
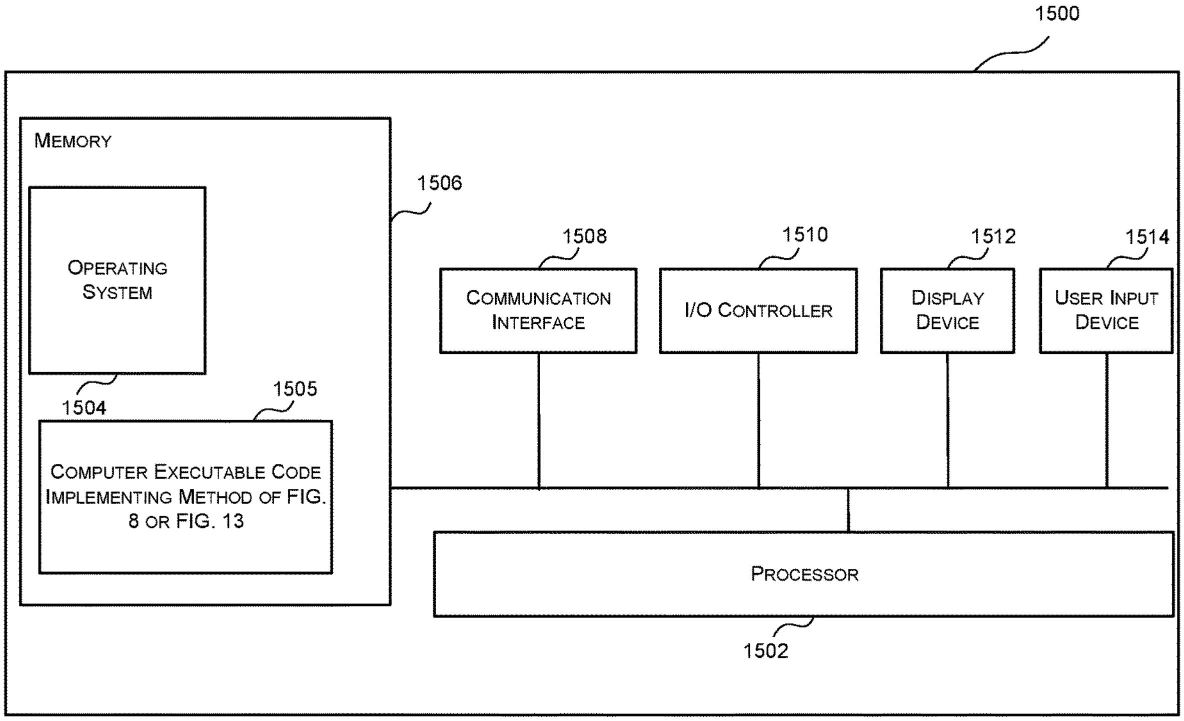
FIG. 15 is a block diagram of an example computing-based device.

FIG. 15 illustrates various components of an exemplary general purpose computing-based device 1500 which may be implemented as any form of a computing and/or electronic device, and in which embodiments of the methods 800, 1300 of FIGS. 8 and 13 described above may be implemented.

Computing-based device 1500 comprises one or more processors 1502 which may be microprocessors, controllers or any other suitable type of processors for processing computer executable instructions to control the operation of the device in order to assess the performance of an integrated circuit defined by a hardware design in completing a task. In some examples, for example where a system on a chip architecture is used, the processors 1502 may include one or more fixed function blocks (also referred to as accelerators) which implement a part of the method of determining the number format for representing a set of values input to, or output from, a layer of a DNN in hardware (rather than software or firmware). Platform software comprising an operating system 1504 or any other suitable platform software may be provided at the computing-based device to enable application software, such as computer executable code 1505 for implementing one or more of the methods 800, 1300 of FIGS. 8 and 13, to be executed on the device.

The computer executable instructions may be provided using any computer-readable media that is accessible by computing-based device 1500. Computer-readable media may include, for example, computer storage media such as memory 1506 and communications media. Computer storage media (i.e. non-transitory machine readable media), such as memory 1506, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1506) is shown within the computing-based device 1500 it will be appreciated that the storage may be distributed or located remotely and accessed via a network or other communication link (e.g. using communication interface 1508).

The computing-based device 1500 also comprises an input/output controller 1510 arranged to output display information to a display device 1512 which may be separate from or integral to the computing-based device 1500. The display information may provide a graphical user interface. The input/output controller 1510 is also arranged to receive and process input from one or more devices, such as a user input device 1514 (e.g. a mouse or a keyboard). In an embodiment the display device 1512 may also act as the user input device 1514 if it is a touch sensitive display device. The input/output controller 1510 may also output data to devices other than the display device, e.g. a locally connected printing device (not shown in FIG. 15).

Figure 16:
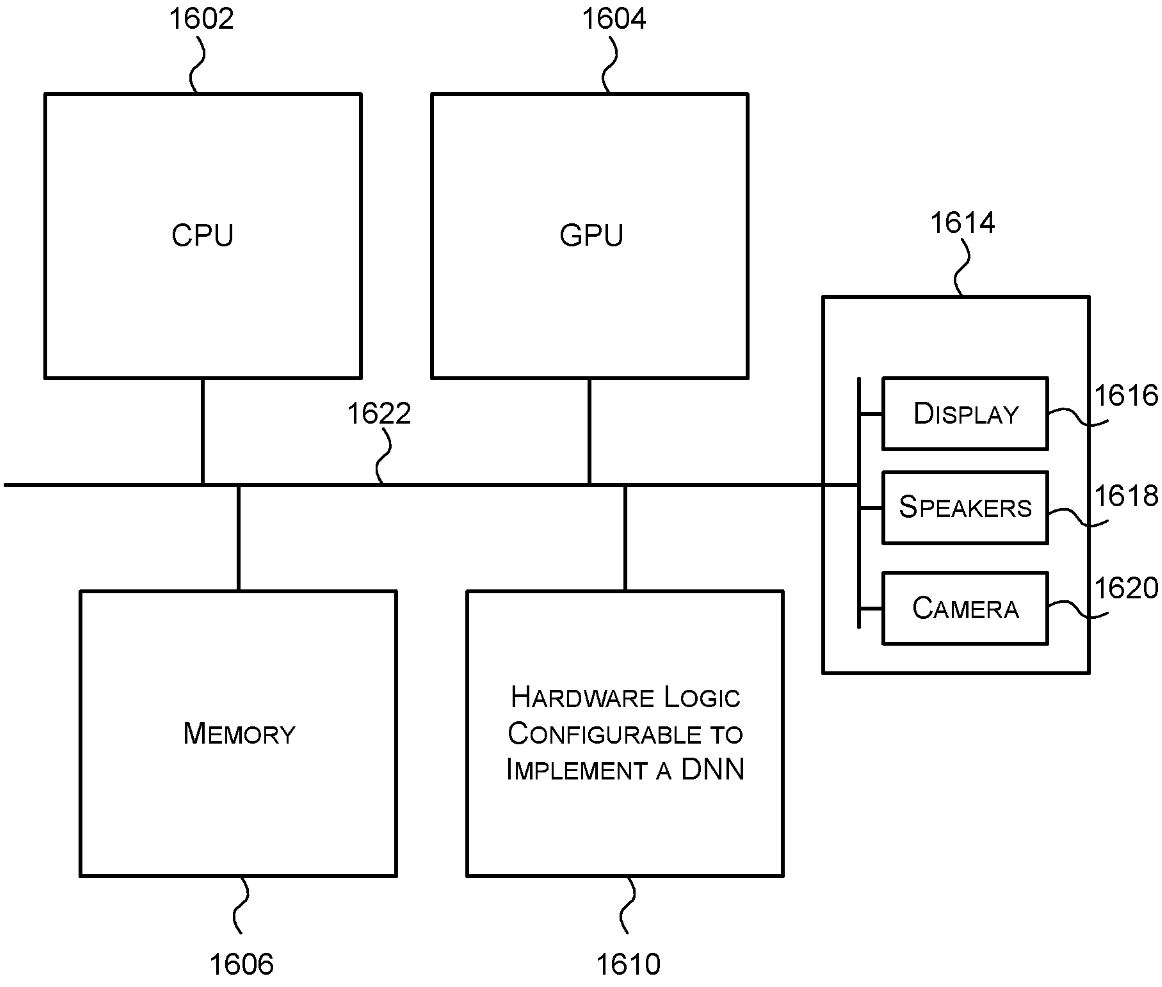
FIG. 16 is a block diagram of an example computer system in which a DNN accelerator may be implemented.

FIG. 16 shows a computer system in which the hardware logic (e.g. DNN accelerator 1400) configurable to implement a DNN described herein may be implemented. The computer system comprises a CPU 1602, a GPU 1604, a memory 1606 and other devices 1614, such as a display 1616, speakers 1618 and a camera 1620. The computer system also comprises hardware logic configurable to implement a DNN 1610 (e.g. the DNN accelerator 1400 of FIG. 14) which may receive control information from the CPU 1602 and/or the GPU 1604. The components of the computer system can communicate with each other via a communications bus 1622. In other examples, the hardware logic configurable to implement a DNN 1610 may be implemented as part of the CPU or the GPU. In some examples, there may not be a GPU.

The DNN accelerator 1400 of FIG. 14 is shown as comprising a number of functional blocks. This is schematic only and is not intended to define a strict division between different logic elements of such entities. Each functional block may be provided in any suitable manner. It is to be understood that intermediate values described herein as being formed by a DNN accelerator or a processing module need not be physically generated by the DNN accelerator or the processing module at any point and may merely represent logical values which conveniently describe the processing performed by the DNN accelerator or the processing module between its input and output.

The hardware logic configurable to implement a DNN (e.g. the DNN accelerator 1400 of FIG. 14) described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture hardware logic configurable to implement a DNN (e.g. DNN accelerator) described herein. An integrated circuit definition dataset may be, for example, an integrated circuit description.

Therefore, there may be provided a method of manufacturing, at an integrated circuit manufacturing system, hardware logic configurable to implement a DNN (e.g. DNN accelerator 1400 of FIG. 14) as described herein. Furthermore, there may be provided an integrated circuit definition dataset that, when processed in an integrated circuit manufacturing system, causes the method of manufacturing hardware logic configurable to implement a DNN (e.g. DNN accelerator 1400 of FIG. 14) to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture hardware logic configurable to implement a DNN (e.g. DNN accelerator) will now be described with respect to FIG. 17.

Figure 17:
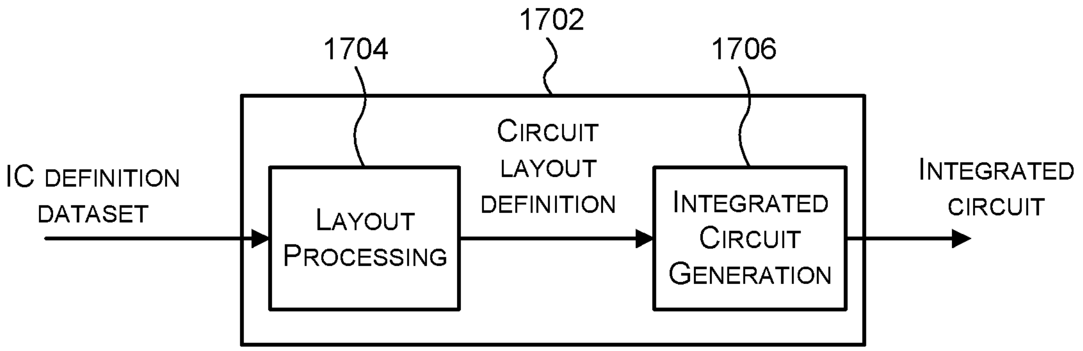
FIG. 17 is a block diagram of an example integrated circuit manufacturing system for generating an integrated circuit embodying a DNN accelerator as described herein.

FIG. 17 shows an example of an integrated circuit (IC) manufacturing system 1702 which is configured to manufacture hardware logic configurable to implement a DNN (e.g. DNN accelerator) as described in any of the examples herein. In particular, the IC manufacturing system 1702 comprises a layout processing system 1704 and an integrated circuit generation system 1706. The IC manufacturing system 1702 is configured to receive an IC definition dataset (e.g. defining hardware logic configurable to implement a DNN (e.g. DNN accelerator) as described in any of the examples herein), process the IC definition dataset, and generate an IC according to the IC definition dataset (e.g. which embodies hardware logic configurable to implement a DNN (e.g. DNN accelerator) as described in any of the examples herein). The processing of the IC definition dataset configures the IC manufacturing system 1702 to manufacture an integrated circuit embodying hardware logic configurable to implement a DNN (e.g. DNN accelerator) as described in any of the examples herein.

The layout processing system 1704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1704 has determined the circuit layout it may output a circuit layout definition to the IC generation system 1706. A circuit layout definition may be, for example, a circuit layout description.

The IC generation system 1706 generates an IC according to the circuit layout definition, as is known in the art. For example, the IC generation system 1706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1706 may be in the form of computer-readable code which the IC generation system 1706 can use to form a suitable mask for use in generating an IC.

The different processes performed by the IC manufacturing system 1702 may be implemented all in one location, e.g. by one party. Alternatively, the IC manufacturing system 1702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture hardware logic configurable to implement a DNN (e.g. DNN accelerator) without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 17 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 17, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of configuring hardware logic to implement a Deep Neural Network (DNN), the hardware logic being configured to represent and process network parameters in a fixed point number format, the method comprising:

determining, by a processor, a sensitivity of the DNN with respect to each network parameter in a set of network parameters;

for each candidate number format of a plurality of candidate number formats:

determining, by a processor, a quantisation error associated with quantising each network parameter in the set of network parameters in accordance with the candidate number format, generating, by a processor, an estimate of an error in an output of the DNN caused by quantisation of the set of network parameters based on the sensitivities and the quantisation errors, and generating, by a processor, a local error based on the estimated error;

selecting, by a processor, the candidate number format of the plurality of candidate number formats with the minimum local error as a number format for the set of network parameters; and configuring said hardware logic to use said selected candidate number format.

2. The method of claim 1, wherein determining the sensitivity of the DNN with respect to a network parameter comprises:

determining an output of a model of the DNN in response to test data;

determining a partial derivative of one or more values based on the output of the DNN with respect to the network parameter; and determining the sensitivity from the one or more partial derivatives.

3. The method of claim 2, wherein the one or more partial derivatives are determined by a back-propagation technique.

4. The method of claim 2, wherein the model of the DNN is a floating point model of the DNN.

5. The method of claim 2, wherein the output of the DNN comprises a single value and the one or more values based on the output of the DNN comprises the single output value; or wherein the output of the DNN comprises a plurality of values and the one or more values based on the output of the DNN comprises each of the plurality of output values.

6. The method of claim 2, wherein the output of the DNN comprises a plurality of values and the one or more values based on the output of the DNN comprises a single summary value based on the plurality of output values.

7. The method of claim 6, wherein the summary value is a sum of the plurality of output values or a maximum of the plurality of output values.

8. The method of claim 1, wherein generating the estimate of the error in the output of the DNN caused by quantisation of the set of network parameters comprises calculating a weighted sum of the quantisation errors wherein the weight associated with a quantisation error for a network parameter is the sensitivity of the DNN with respect to that network parameter.

9. The method of claim 1, wherein generating the estimate of the error in the output of the DNN caused by quantisation of the set of network parameters comprises calculating an absolute value of a weighted sum of the quantisation errors wherein the weight associated with a quantisation error for a network parameter is the sensitivity of the DNN with respect to that network parameter.

10. The method of claim 1, wherein generating the estimate of the error in the output of the DNN caused by quantisation of the set of network parameters comprises: (i) calculating, for each network parameter in the set, the absolute value of the product of the quantisation error for that network parameter and the sensitivity of the DNN with respect to that network parameter; and (ii) calculating a sum of the absolute values.

11. The method of claim 1, wherein generating the estimate of the error in the output of the DNN caused by quantisation of the set of network parameters comprises: (i) calculating, for each network parameter, the square of the quantisation error for that network parameter; (ii) calculating, for each network parameter, the product of the square of the quantisation error for that network parameter, and the absolute value of the sensitivity of the DNN with respect to that network parameter; and (iii) calculating a sum of the products.

12. The method of claim 1, wherein:

each candidate number format is defined by a bit width;

at least two of the candidate number formats have different bit widths; and the local error is further based on a size parameter.

13. The method of claim 12, wherein the size parameter is based on a number of bits to represent the network parameters in the set when the network parameters in the set are quantised in accordance with the candidate number format.

14. The method of claim 1, wherein the set of network parameters is one of: all or a portion of input data values for a layer of the DNN; all or a portion of weights for a layer of the DNN; all or a portion of biases of a layer of the DNN; and all or a portion of output data values of a layer of the DNN.

15. The method of claim 1, further comprising configuring hardware logic to implement the DNN using the selected number format by configuring the hardware logic to receive and process the set of network parameters in accordance with the selected number format.

16. A method of configuring hardware logic to implement a Deep Neural Network (DNN), the method comprising:

dividing network parameters of the DNN into a plurality of sets of network parameters, each set comprising two or more network parameters; and executing the method as set forth in claim 1 for each set of network parameters.

17. A computing-based device for configuring hardware logic to implement a Deep Neural Network (DNN), the hardware logic being configured to represent and process network parameters in a fixed point number format, the computing-based device comprising:

at least one processor; and memory coupled to the at least one processor, the memory comprising computer readable code that when executed by the at least one processor causes the at least one processor to:

determine a sensitivity of the DNN with respect to each network parameter in a set of network parameters;

for each candidate number format of a plurality of candidate number formats:

determine a quantisation error associated with quantising each network parameter in the set of network parameters in accordance with the candidate number format, generate an estimate of an error in an output of the DNN caused by quantisation of the set of network parameters based on the sensitivities and the quantisation errors, and generate a local error based on the estimated error;

select the candidate number format with the minimum local error as a number format for the set of network parameters; and configure said hardware logic to use said selected candidate number format.

18. A non-transitory computer readable storage medium having stored thereon computer readable instructions that, when executed at a computer system, cause the computer system to perform the method as set forth in claim 1.

19. The method of claim 1, wherein the determining a quantisation error is performed in a floating point number format.

20. The method of claim 1, wherein the determining a sensitivity of the DNN with respect to each network parameter in a set of network parameters is performed in a floating point number format.

* * * * *